(12) United States Patent
Johnson et al.

(10) Patent No.: US 10,718,103 B2
(45) Date of Patent: Jul. 21, 2020

(54) PUSH-BUTTON DIVERTER VALVE

(71) Applicant: Delta Faucet Company, Indianapolis, IN (US)

(72) Inventors: Brian W. Johnson, Muncie, IN (US); Todd A. Huffington, Avon, IN (US); Mark A. Cipriani, Carmel, IN (US); Garry R. Marty, Fishers, IN (US)

(73) Assignee: Delta Faucet Company, Indianapolis, IN (US)

( * ) Notice: Subject to any disclaimer, the term of this patent is extended or adjusted under 35 U.S.C. 154(b) by 67 days.

(21) Appl. No.: 16/054,990

(22) Filed: Aug. 3, 2018

(65) Prior Publication Data

US 2020/0040557 A1 Feb. 6, 2020

(51) Int. Cl.
| | | |
|---|---|---|
| *F16K 11/044* | (2006.01) | |
| *E03C 1/02* | (2006.01) | |
| *E03C 1/04* | (2006.01) | |
| *F16K 11/056* | (2006.01) | |

(52) U.S. Cl.
CPC ............ *E03C 1/023* (2013.01); *E03C 1/0404* (2013.01); *F16K 11/0445* (2013.01); *F16K 11/056* (2013.01); *E03C 2201/30* (2013.01)

(58) Field of Classification Search
None
See application file for complete search history.

(56) References Cited

U.S. PATENT DOCUMENTS

| | | |
|---|---|---|
| 2,663,539 A | 12/1953 | Kersten et al. |
| 3,656,503 A | 4/1972 | Ward |
| 3,801,997 A | 4/1974 | Ward |
| 3,826,274 A | 7/1974 | Moen |
| 4,095,610 A | 6/1978 | Priesmeyer |
| 4,171,005 A | 10/1979 | Nicklas |
| 4,241,754 A | 12/1980 | Moen |
| 4,523,604 A | 6/1985 | Hutto |
| 4,563,780 A | 1/1986 | Pollack |
| 4,628,962 A | 12/1986 | Pezzarossi |
| 5,069,241 A * | 12/1991 | Hochstrasser ...... F16K 11/0445 137/119.05 |

(Continued)

FOREIGN PATENT DOCUMENTS

| | | |
|---|---|---|
| DE | 101 09 726 | 9/2002 |
| EP | 0 684 535 | 11/1995 |

(Continued)

OTHER PUBLICATIONS

Delta Faucet Company, Multichoice Push Button Diverter Rough-In Body, Model R10300-UNWS, at least as early as Jun. 2017, 6 pages, retrieved from www.deltacommercialfaucets.com.

(Continued)

*Primary Examiner* — John Fox

(74) *Attorney, Agent, or Firm* — Faegre Drinker Biddle & Reath LLP

(57) ABSTRACT

A shower valve assembly configured to divert water between a tub port and a shower port. The diverter valve assembly position or state is changed by pushing a button connected to a stem and a poppet valve. When the water supply is turned off, a poppet spring shifts the poppet valve to a tub open position, and a check valve spring opens a check valve, allowing water from the shower port to flow out of the tub port.

32 Claims, 19 Drawing Sheets

(56) References Cited

U.S. PATENT DOCUMENTS

| | | |
|---|---|---|
| 5,251,811 A | 10/1993 | Frankholz |
| 5,355,906 A | 10/1994 | Marty et al. |
| 5,402,822 A * | 4/1995 | Brouwer ............ F16K 11/0445 137/526 |
| 5,725,010 A | 3/1998 | Marty et al. |
| 6,182,700 B1 * | 2/2001 | Hannemann ........ F16K 11/0445 137/872 |
| 6,283,447 B1 | 9/2001 | Fleet |
| 6,973,937 B1 * | 12/2005 | Yang ...................... E03C 1/023 137/119.05 |
| 7,077,150 B2 * | 7/2006 | McNerney ............. E03C 1/042 137/15.01 |
| 8,118,057 B2 | 2/2012 | Deutsch et al. |
| 8,176,580 B2 | 5/2012 | Kajuch et al. |
| 8,251,090 B2 | 8/2012 | Lin |
| 8,632,023 B2 | 1/2014 | Miller et al. |
| 8,656,954 B2 | 2/2014 | Deutsch et al. |
| 9,050,612 B2 | 6/2015 | Miller et al. |
| 2010/0006164 A1 | 1/2010 | Moncayo et al. |
| 2010/0147405 A1 * | 6/2010 | Niver ...................... E03C 1/023 137/625.48 |

FOREIGN PATENT DOCUMENTS

| | | |
|---|---|---|
| GB | 1185985 | 4/1970 |
| WO | WO 2005/003877 | 1/2005 |

OTHER PUBLICATIONS

Terry Love's DIY Forums, How does shower line drain through tub spout when valve is off and diverter is set to tub?, at least as early as Jun. 2017, 3 pages, retrieved from https://terrylove.com/forums/index.php?threads/how-does-shower-line-drain-through-tub-spout-when-valve-is-off-and-diverter-is-set-to-tub.65091/.

* cited by examiner

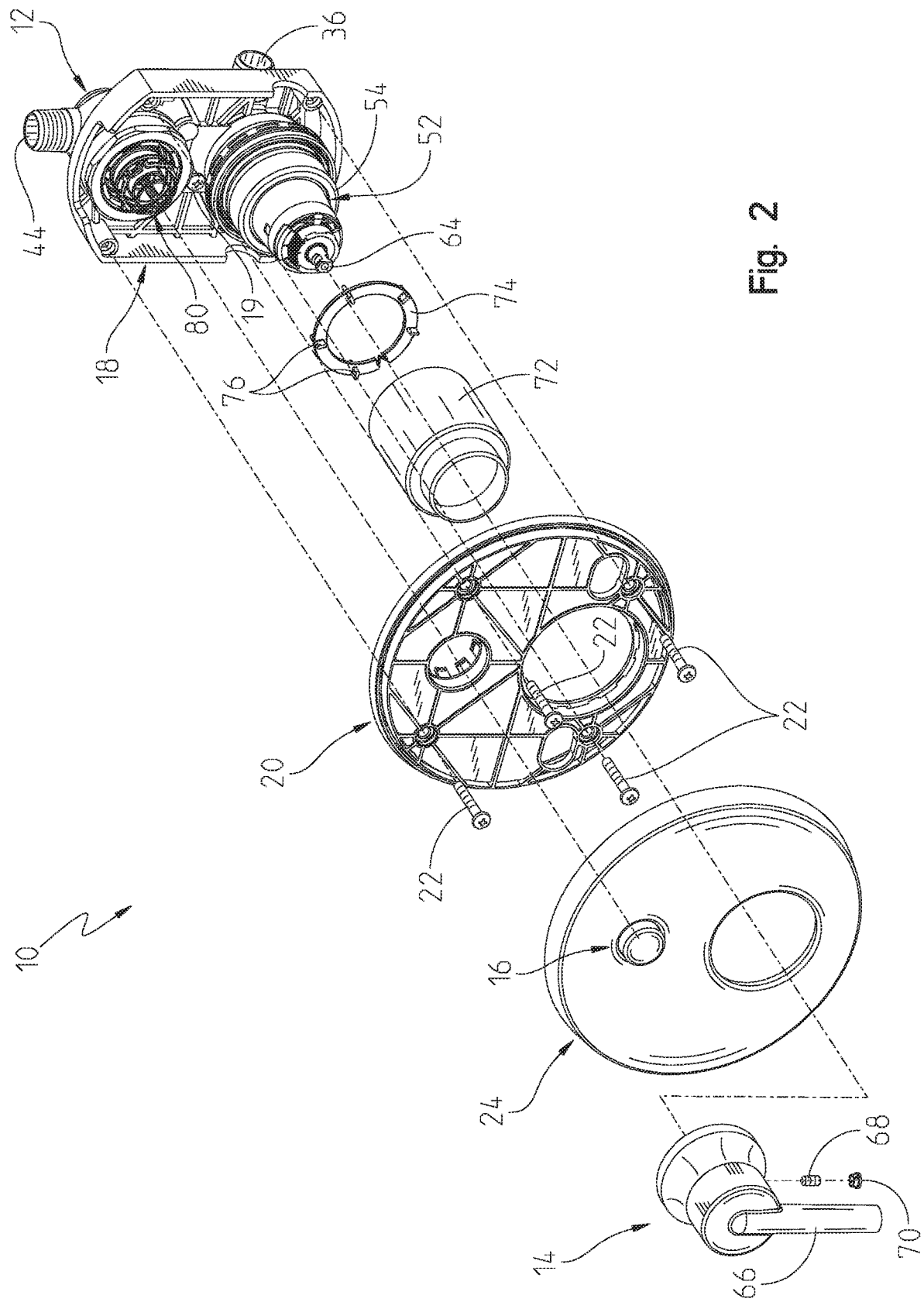

PUSH-BUTTON DIVERTER VALVE

BACKGROUND AND SUMMARY OF THE DISCLOSURE

The present invention relates generally to a faucet diverter valve and, more particularly, to a push-button diverter valve for tub/shower applications.

Push-button flow diverter valves for tub/shower applications are often desirable for their appearance and ease of use. By incorporating the diverter valve into a main valve, a separate diverter rough and trim are not needed, thereby reducing cost and improving installation efficiency. Also, if the diverter valve is not incorporated into the tub spout, the tub spout design can be simpler, sleeker, and less expensive.

According to an illustrative embodiment of the present disclosure, a shower valve assembly includes a valve body, a main or mixing valve cartridge to control water temperature and flow, and a diverter valve cartridge to control water flow to at least two outlet ports. The shower valve assembly may also include hot and cold water supply stops to allow the water to be shut off at the shower valve assembly instead of shutting off water to the whole structure, floor, or unit, when servicing is required.

According to an illustrative embodiment of the present disclosure, a shower valve assembly includes a valve body including a first receiving cavity and a second receiving cavity. A cold water inlet port, a hot water inlet port and a connecting outlet port are in fluid communication with the first receiving cavity. A connecting inlet port, a first outlet port and a second outlet port are in fluid communication with the second receiving cavity. The connecting inlet port is in fluid communication with the connecting outlet port via a connecting waterway. A mixing valve assembly is supported within the first receiving cavity, the mixing valve assembly configured to control water flow from the cold water inlet and the hot water inlet to the connecting outlet port. A diverter valve assembly is supported within the second receiving cavity, and is configured to control water flow from the connecting inlet port to at least one of the first outlet port and the second outlet port. The diverter valve assembly includes a push-button, and a valve stem extending along a longitudinal axis between a first end and a second end, the first end being operably coupled to the push-button. The diverter valve assembly further includes a flow control chamber, a first outlet valve seat supported within the flow control chamber, and a second outlet valve seat supported within the flow control chamber in axially spaced relation to the first outlet valve seat. A poppet valve is supported by the second end of the valve stem and is axially movable within the flow control chamber, the poppet valve including a poppet valve body defining an internal chamber, a first seal selectively engageable with the first outlet valve seat, a second seal in axially spaced relation to the first seal and selectively engageable with the second outlet valve seat, and a spring operably coupled to the second end of the valve stem and configured to bias the first seal toward the first outlet valve seat. A check valve is operably coupled to the poppet valve, the check valve including a movable valve member received within the internal chamber of the poppet valve body.

According to another illustrative embodiment of the present disclosure, a shower valve assembly includes a valve body including a connecting inlet port, a first outlet port, and a second outlet port. A diverter valve assembly is configured to control water flow from the connecting inlet port to at least one of the first outlet port and the second outlet port. The diverter valve assembly includes a push-button, and a valve stem extending along a longitudinal axis between a first end and a second end, the first end being operably coupled to the push-button. A flow control chamber receives the second end of the valve stem. A first outlet valve seat is supported within the flow control chamber, and a second outlet valve seat is supported within the flow control chamber in axially spaced relation to the first outlet valve seat. A poppet valve is supported by the second end of the valve stem and is axially movable within the flow control chamber, the poppet valve including a poppet valve body defining an internal chamber, a first seal selectively engageable with the first outlet valve seat, and a second seal in axially spaced relation to the first seal and selectively engageable with the second outlet valve seat. A check valve is operably coupled to the poppet valve, the check valve including a first check valve seat supported within the internal chamber of the poppet valve body, a second check valve seat supported within the internal chamber of the poppet valve body in axially spaced relation to the first check valve seat, and a valve member received within the internal chamber of the poppet valve body. The valve member of the check valve is movable from a first position in contact with the first check valve seat, a second position in contact with the second check valve seat, and a third position intermediate the first position and the second position. A first mode of operation is defined when the connecting inlet port is in fluid communication with the first outlet port, and the connecting inlet port is sealed from the second outlet port. The first seal of the poppet valve body engages the first outlet valve seat, and the valve element of the check valve engages the first check valve seat in the first mode of operation. A second mode of operation is defined when the connecting inlet port is in fluid communication with the second outlet port, and the connecting inlet port is sealed from the first outlet port. The second seal of the poppet valve body engages the second outlet valve seat, and the valve element of the check valve engages the second check valve seat in the second mode of operation. A third mode of operation is defined when the second outlet port is in fluid communication with the first outlet port. The valve element of the check valve is in the intermediate position in the third mode of operation.

According to a further illustrative embodiment of the present disclosure, a shower valve assembly includes a valve body having a first receiving cavity and a second receiving cavity. A cold water inlet port, a hot water inlet port and a connecting outlet port are in fluid communication with the first receiving cavity. A connecting inlet port, a first outlet port and a second outlet port are in fluid communication with the second receiving cavity. The connecting inlet port is in fluid communication with the connecting outlet port via a connecting waterway. A mixing valve assembly is supported within the first receiving cavity, the mixing valve assembly configured to control water flow from the cold water inlet and the hot water inlet to the connecting outlet port. A diverter valve assembly is supported within the second receiving cavity, and is configured to control water flow from connecting inlet port to at least one of the first outlet port and the second outlet port. The diverter valve assembly includes a push-button, and a valve stem extending along a longitudinal axis between a first end and a second end, the first end being operably coupled to the push-button. The diverter valve assembly further includes a flow control chamber, a first outlet valve seat supported within the flow control chamber, and a second outlet valve seat supported within the flow control chamber in axially spaced relation to the first outlet valve seat. A flow control valve is supported by the second end of the valve stem and is axially movable within the flow control chamber, the flow control valve being movable between a first position in engagement with the first outlet valve seat and a second position in engagement with the second outlet valve seat. A check valve is operably coupled to the flow control valve. A first mode of operation is defined when the connecting inlet port is in fluid communication with the first outlet port, and the connecting inlet port is sealed from the second outlet port. The flow control valve is in the first position, in engagement with the first outlet valve seat, and the check valve seals the first outlet port from the second outlet port in the first mode of operation. A second mode of operation is defined when the connecting inlet port is in fluid communication with the second outlet port, and the connecting inlet port is sealed from the first outlet port. The flow control valve is in the second position, in engagement with the second outlet valve seat, and the check valve seals the first outlet port from the second outlet port in the second mode of operation. A third mode of operation is defined when the check valve provides fluid communication between the second outlet port and the first outlet port.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

A detailed description of the drawings particularly refers to the accompanying figures, in which:

FIG. 2 is a partially exploded view of a front portion of the shower valve assembly of FIG. 1;

DETAILED DESCRIPTION OF THE DRAWINGS

Figure 1:
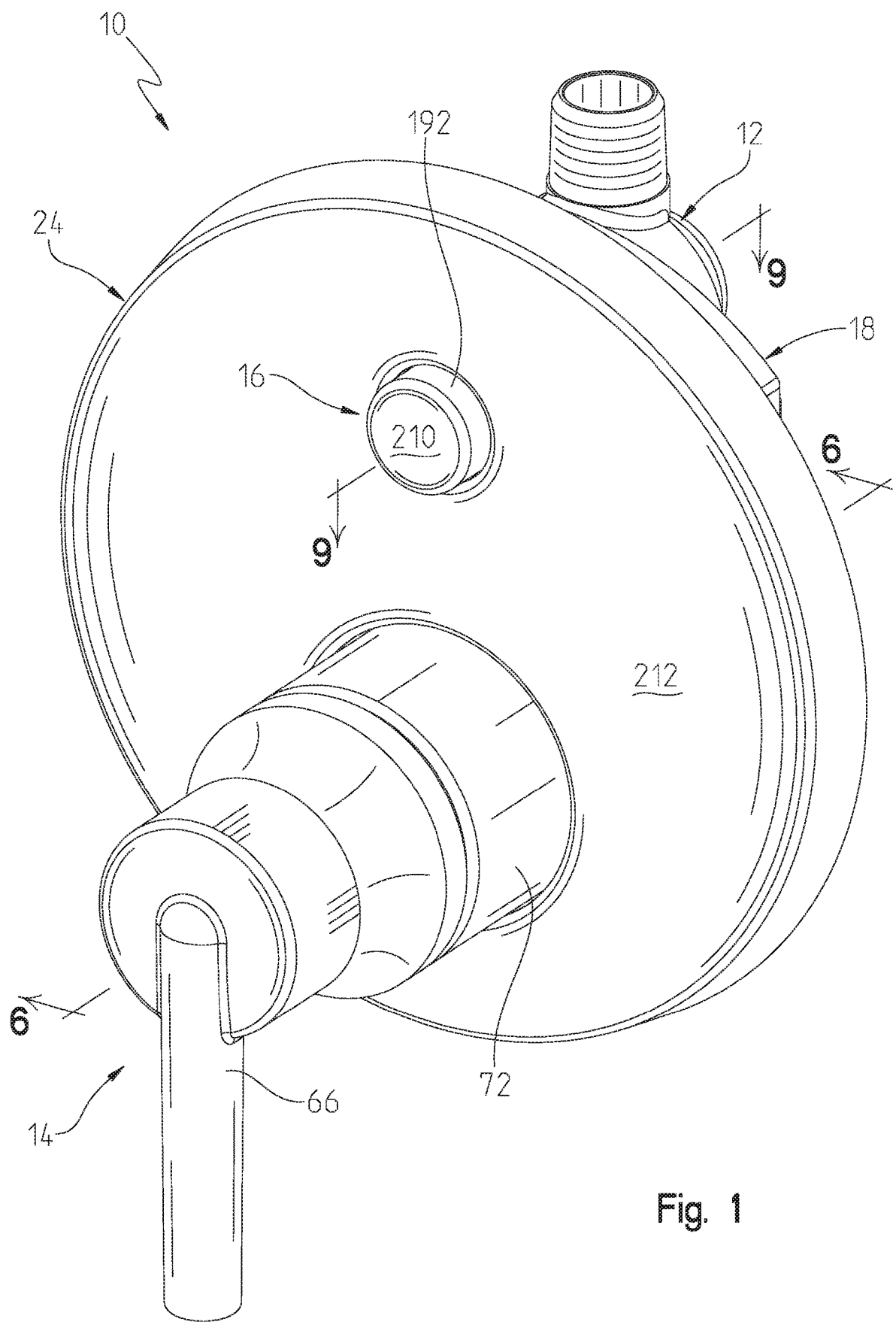
FIG. 1 is a perspective view of a shower valve assembly of the present disclosure.

The embodiments of the invention described herein are not intended to be exhaustive or to limit the invention to precise forms disclosed. Rather, the embodiments selected for description have been chosen to enable one skilled in the art to practice the invention. While the disclosure is described in connection with water, it should be understood that additional types of fluids may be used. Additionally, while the valve assembly disclosed herein is shown for use with fluid delivery devices associated with a shower, it should be appreciated that it may be incorporated for use with other fluid delivery devices.

Referring initially to FIGS. 1-4, an illustrative embodiment shower valve assembly 10 includes a valve fitting or body 12 supporting a main or mixing valve assembly 14 and a diverter valve assembly 16. Illustratively, the valve body 12 is formed of a durable material configured to convey water, such as brass. Mounting openings 17 (FIGS. 3A-4) may be formed in the valve body 12 to secure the shower valve assembly 10 to studs of a shower wall (not shown).

Figure 3A:
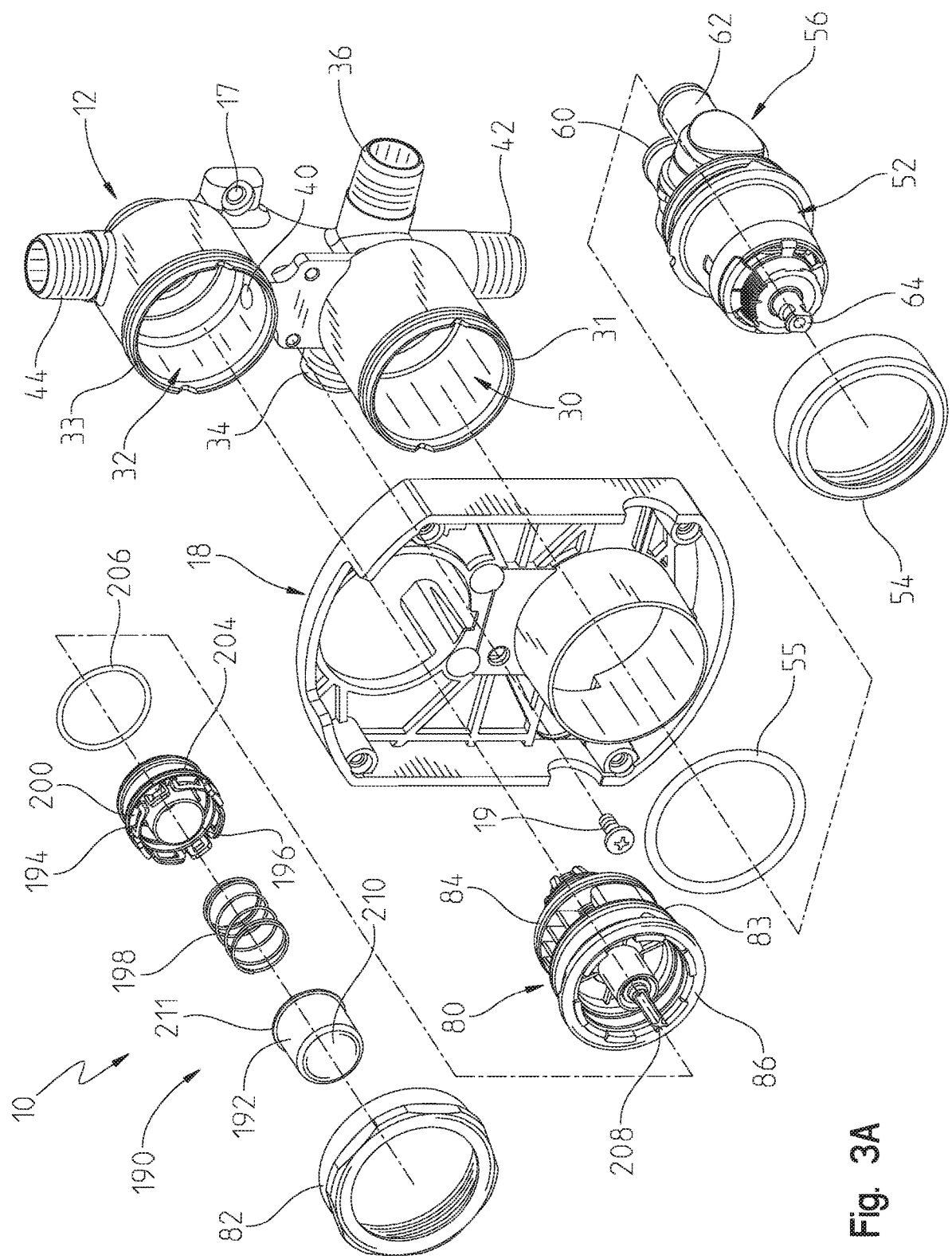
FIG. 3A is a front partially exploded perspective view of a rear portion of the shower valve assembly of FIG. 1.
Figure 3B:
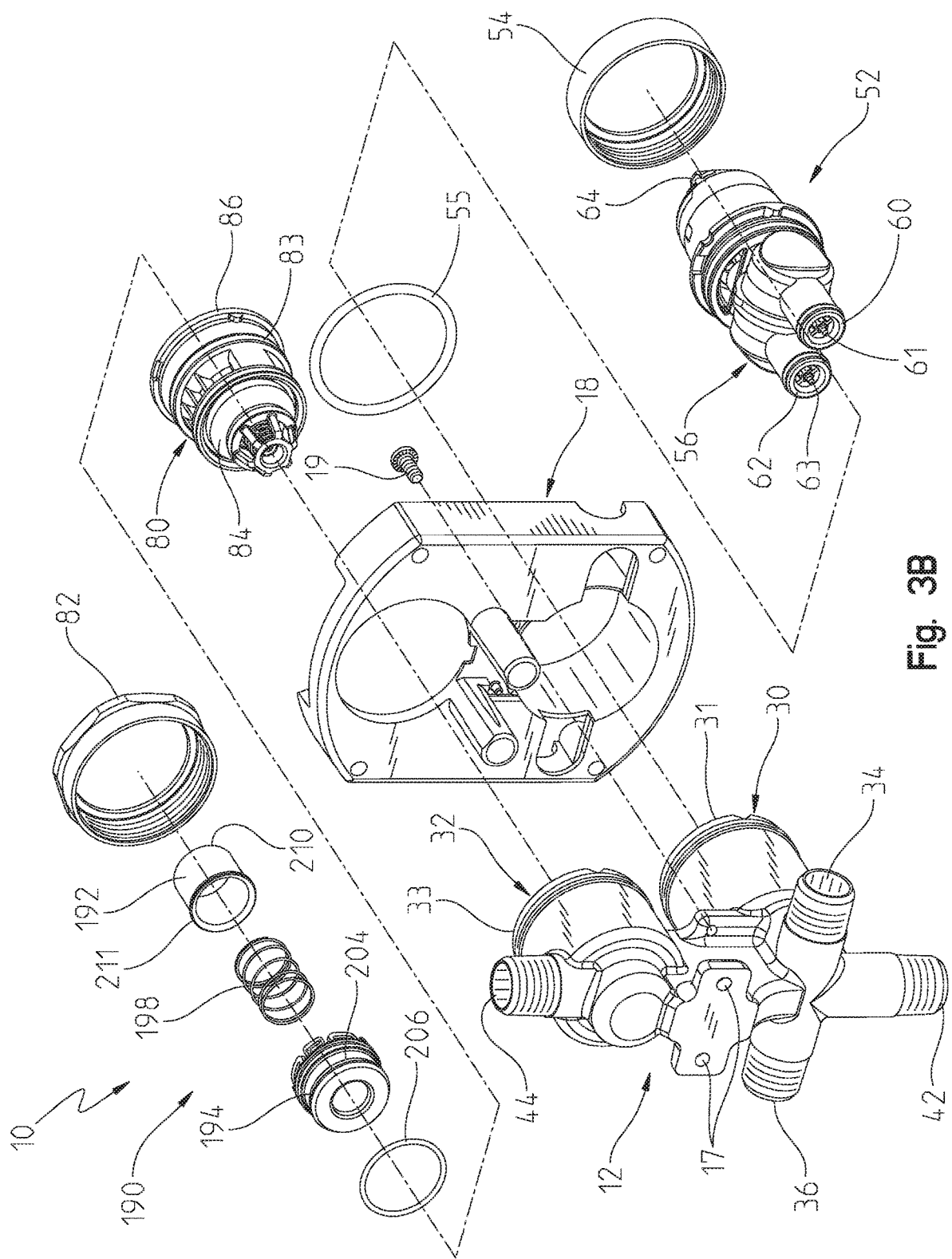
FIG. 3B is a rear partially exploded perspective view similar to FIG. 3A.

With reference to FIGS. 2-3B, a plaster guard 18 is illustratively coupled to the valve body 12, for example, via a screw 19. The plaster guard 18 may be formed of a polymer, such as a thermoplastic, and is configured to protect the shower valve assembly 10 during installation and subsequent construction of the surrounding shower wall.

Figure 6:
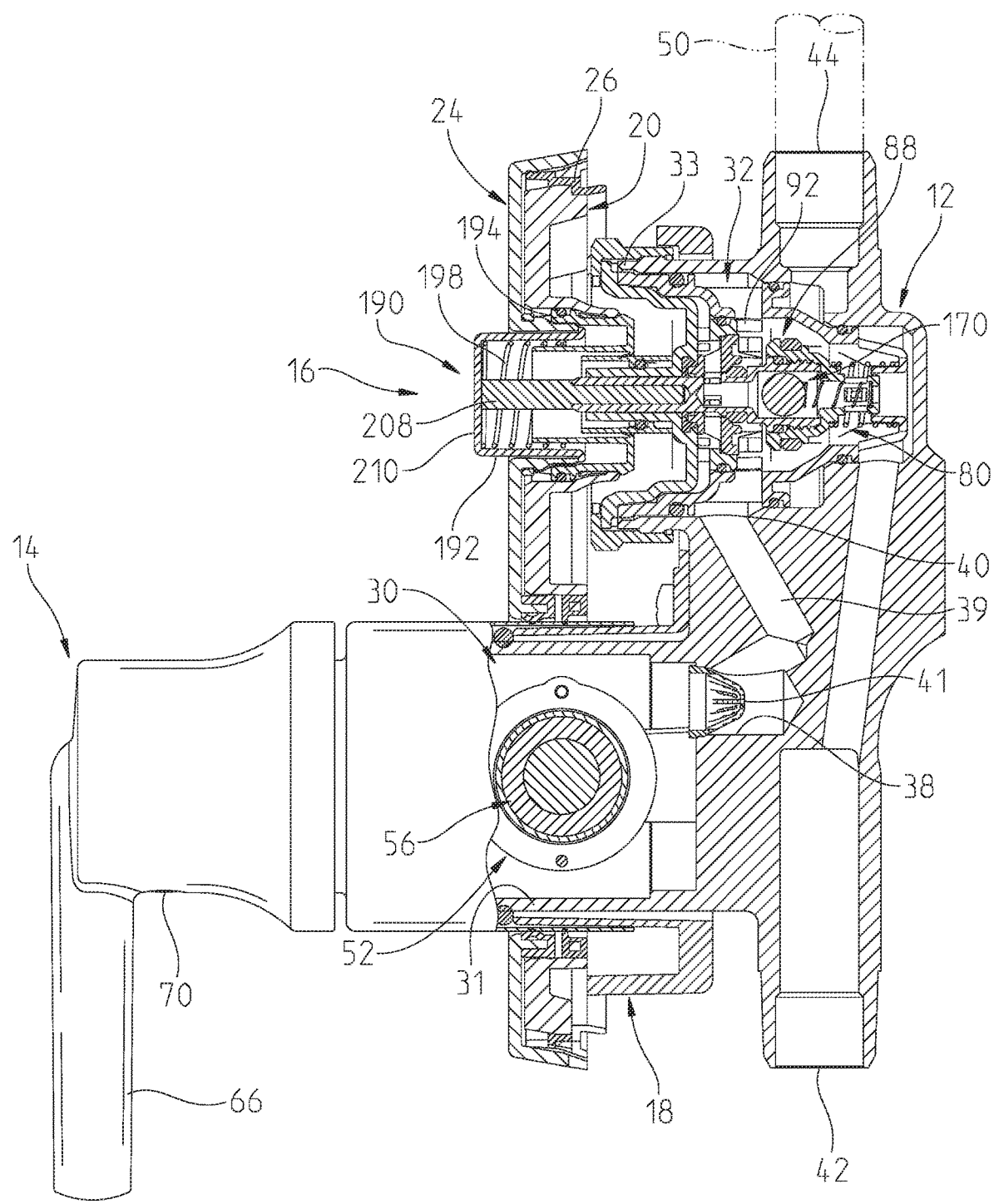
FIG. 6 is a partial cross-sectional view of the shower valve assembly taken along line 6-6 of FIG. 1.

As shown in FIGS. 2 and 6, a wall plate 20 is illustratively coupled to the plaster guard 18, for example, via bolts 22. The wall plate 20 may be formed of a polymer, such as a thermoplastic, and is configured to be positioned in front (proximal) of the shower wall.

An escutcheon or trim 24 is illustratively coupled to the wall plate 20 via conventional couplers, such as snap fingers. The escutcheon 24 illustratively comprises a coated polymer, such as a metal plated thermoplastic. An elastomeric gasket 26 may be received between the escutcheon 24 and the wall plate 20 (FIG. 6).

Figure 4:
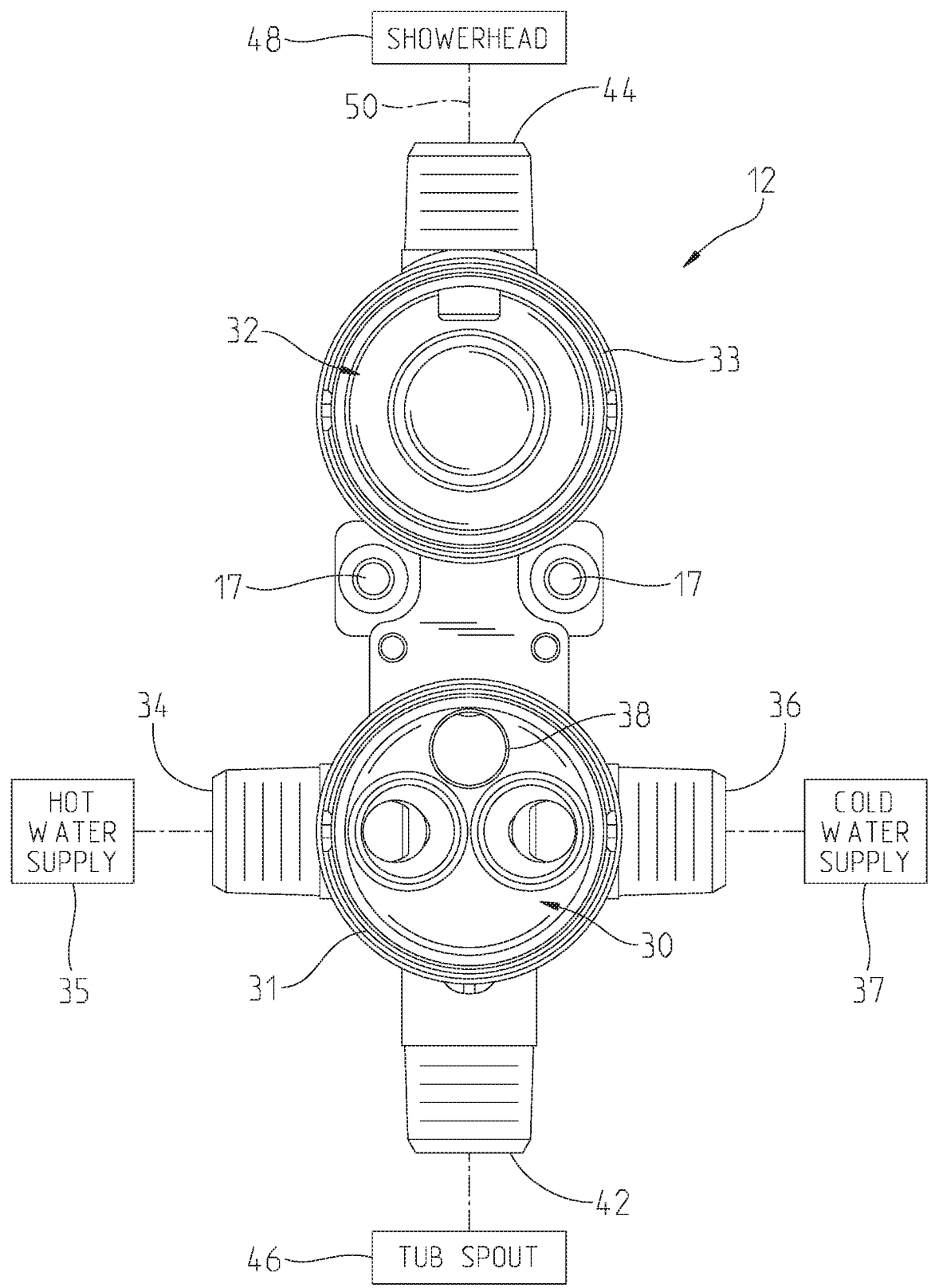
FIG. 4 is a front plan view of the valve body of the shower valve assembly of FIG. 1, with external water connections shown schematically.

With further reference to FIGS. 3A, 3B, 4 and 6, the valve body 12 illustratively includes a first receiving cavity 30 defined by a cylindrical sidewall 31, and a second receiving cavity 32 defined by a cylindrical sidewall 33. The valve body 12 further includes a tubular hot water inlet 34 which is configured to be fluidly coupled to a conventional hot water supply 35, and a tubular cold water inlet 36 which is configured to be fluidly coupled to a conventional cold water supply 37 (FIG. 4). A connecting water outlet or port 38 is illustratively in fluid communication with a connecting water inlet or port 40 via a connecting waterway 39. A filter or screen 41 may be received within the connecting water outlet 38 for filtering debris when flushing the shower valve assembly 10 after installation.

Illustratively, a lower port or first water outlet 42 is fluidly coupled to a first fluid delivery device (such as a tub spout 46), and an upper port or second water outlet 44 is fluidly coupled to a second fluid delivery device (such as a showerhead 48)(FIG. 4). A shower riser 50 illustratively couples the second water outlet 44 and the showerhead 48. In certain illustrative embodiments, the shower valve assembly 10 may include hot and cold water supply stops (not shown) fluidly coupled to the hot and cold water inlets 34 and 36, respectively, to permit water to be shut off at the valve body 12 instead of shutting off water to the whole structure, floor, or unit, for example, when servicing is required.

With reference to FIGS. 2-3B and 6, the main or mixing valve assembly 14 illustratively includes a mixing valve sub-assembly or cartridge 52 non-rotatably disposed in the first receiving chamber or cavity 30. Illustratively, a bonnet nut 54 threadably engages the sidewall 31 to secure the mixing valve cartridge 52 within the first receiving cavity 30. An o-ring 55 illustratively cooperates with the valve body 12 to provide a seal. The illustrative mixing valve assembly 14 includes a spool-type pressure balancing valve 56 in fluid communication with the mixing valve cartridge 52. More particularly, laterally spaced apart axially inwardly projecting first and second tubes 60 and 62 are in fluid communication with the pressure balancing valve 56. The first tube 60 is in fluid communication with the hot water inlet 34 of the valve body 12, while the second tube 62 is in fluid communication with the cold water inlet 36 of the body 12.

With further reference to FIG. 3B, check valves 61 and 63 are illustratively coupled to the tubes 60 and 62 and are configured to prevent cross-flow of hot water from the hot water inlet 34 with cold water from the cold water inlet 36 and vice versa. Such a cross-flow could occur if there is a pressure differential between the hot and cold water inlets 34 and 36.

A valve stem 64 is operably coupled to a valve plate (not shown) wherein the rotation thereof controls the temperature and flow of water from the tubes 60 and 62, and hence the inlets 34 and 36, to the connecting water outlet 38. The mixing valve cartridge 52 may be of conventional design. One such illustrative mixing valve cartridge 52 may be of the type shown in U.S. Pat. Nos. 5,355,906 and 5,725,010 to Marty et al., the disclosures of which are expressly incorporated herein by reference.

With reference to FIGS. 1, 2 and 6, a handle 66 is operably coupled to the valve stem 64, illustratively via a set screw 68, such that rotation of the handle 66 causes corresponding rotation of the valve stem 64. A decorative cap 70 may cover the set screw 68. A cylindrical sleeve 72 is illustratively received around a proximal end of the mixing valve cartridge 52. An annular spacer 74 including axially extending, circumferentially spaced tabs 76 is positioned around the proximal end of the mixing valve cartridge 52 intermediate the bonnet nut 54 and the sleeve 72.

With reference to FIGS. 2-3B and 6, the secondary or diverter valve assembly 16 illustratively includes a diverter valve sub-assembly or cartridge 80 non-rotatably disposed in the second receiving chamber or cavity 32. Illustratively, a bonnet nut 82 threadably engages the sidewall 33 to secure the diverter valve cartridge 80 within the second receiving cavity 32. The illustrative diverter valve cartridge 80 includes a diverter valve housing 83 having a first, or distal, housing portion 84 and a second, or proximal, housing portion 86. The first housing portion 84 is illustratively coupled to the second housing portion 86 via conventional fastening means, such as threads, adhesives or ultrasonic welding. An o-ring 87 may provide a seal between the housing portions 84 and 86 (FIGS. 5A, 5B and 7).

Figure 5A:
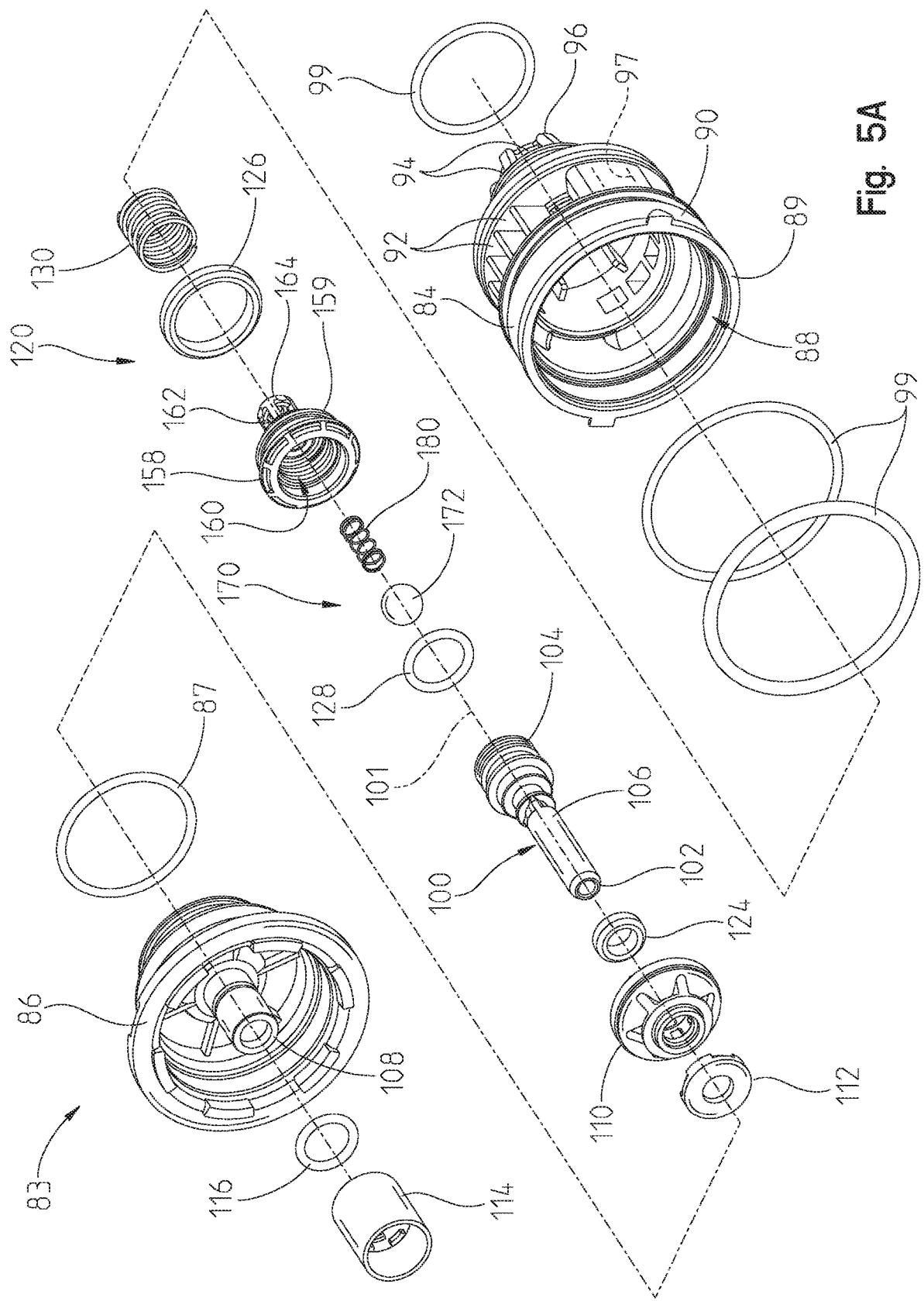
FIG. 5A is a front exploded perspective view of the diverter valve assembly of the present disclosure.
Figure 5B:
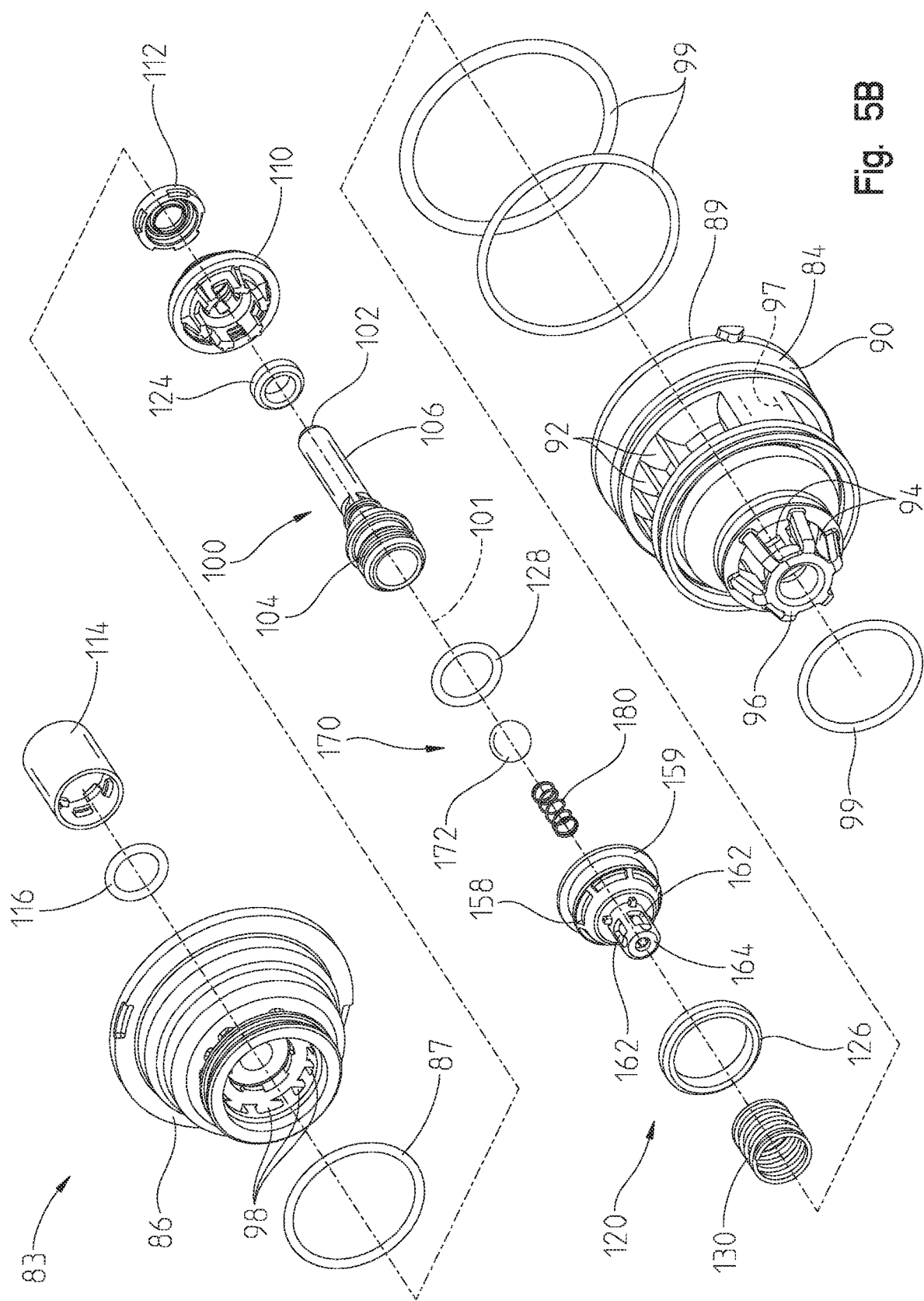
FIG. 5B is a rear exploded perspective view similar to FIG. 5A.
Figure 7:
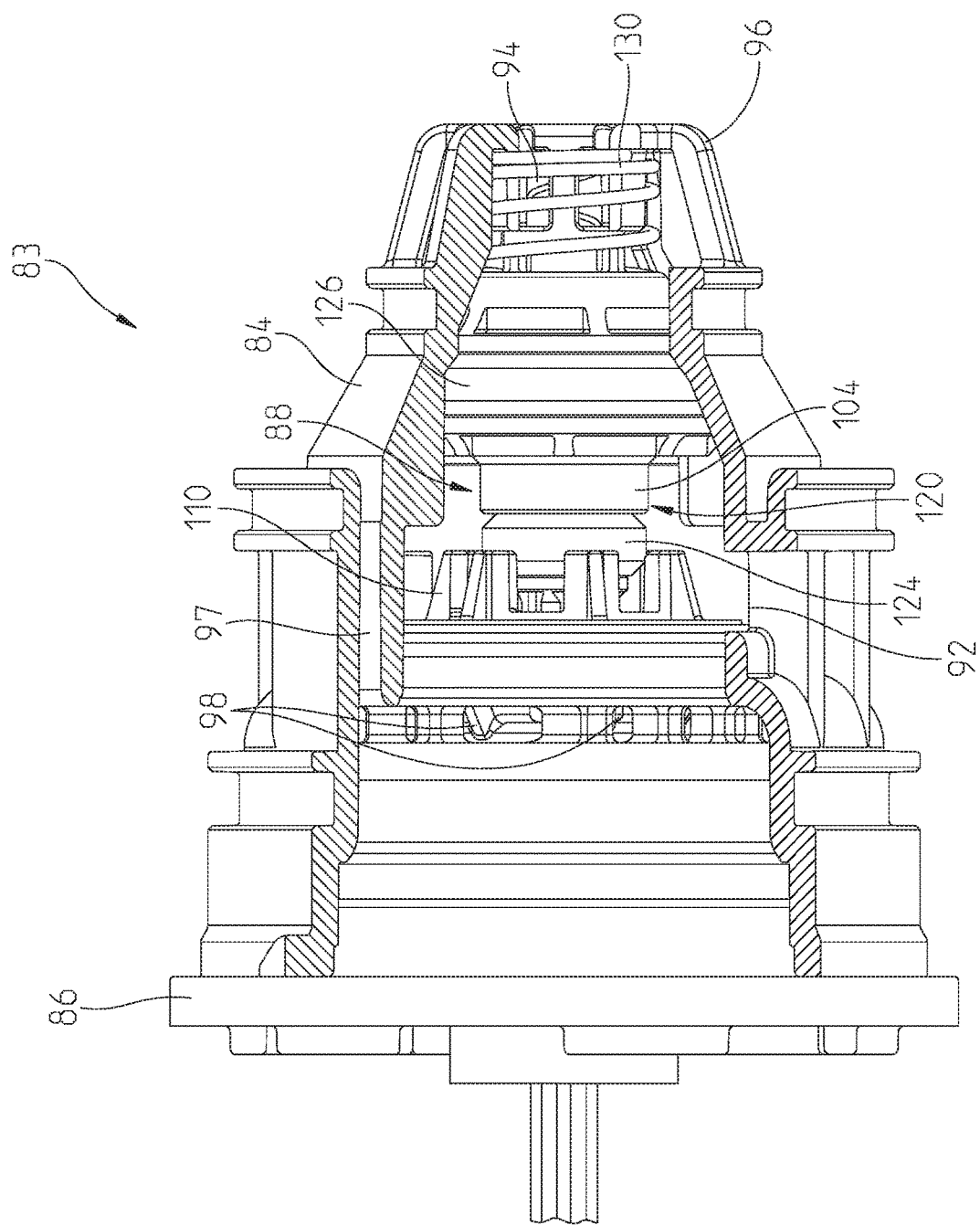
FIG. 7 is a side elevational view, in partial cross-section, of the diverter valve assembly of FIGS. 5A and 5B.
Figure 8:
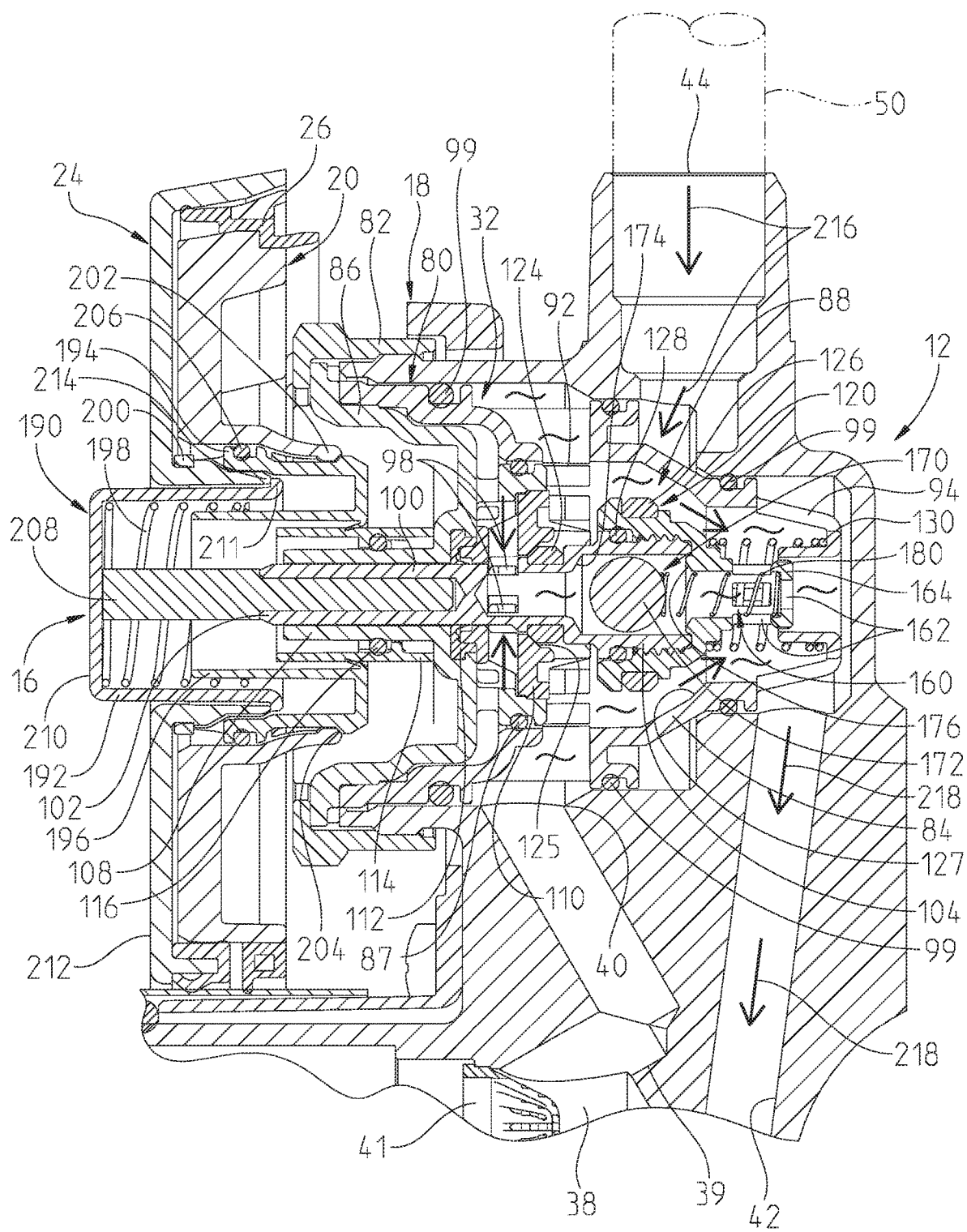
FIG. 8 is a side cross-sectional view of the diverter valve assembly, shown in a default mode of operation.

As shown in FIGS. 5A-8, the first housing portion 84 illustratively includes an internal chamber 88 defined by cylindrical outer wall 89 of body 90. First or proximal openings 92 within the cylindrical outer wall 89 provide fluid communication between the internal chamber 88 and the second receiving cavity 32, and therefore the connecting water inlet 40. Second or distal openings 94 are positioned within a distal end cap 96 of the body 90 in axially spaced relation distal of the first openings 92. Axial extending, diametrically opposed channels 97 are formed within the body 90 of the first housing portion 84, and provide fluid communication between the chamber 32 and a plurality of circumferentially spaced openings 98 formed in the second housing portion 86 (FIGS. 5, 7 and 8). O-rings 99 illustratively seal the first housing portion 84 with the valve body 12.

A stem assembly 100 extends along a longitudinal axis 101 between a first, or proximal end 102, and a second, or distal end 104. The stem assembly 100 includes a cylindrical shaft 106 guided for axial movement within a cylindrical sleeve 108 of the second housing portion 86. A retaining cap 110 is supported within the second housing portion 86 and retains a lip seal 112. The lip seal 112 sealingly engages the shaft 106 of the stem assembly 100. Illustratively, a cylindrical spacer 114 concentrically receives the sleeve 108 of the second housing portion 86 and is frictionally retained in position by an o-ring 116.

A poppet valve 120 is supported by the distal end 104 of the stem assembly 100 within the chamber 88 of the diverter valve housing 83. The poppet valve 120 illustratively includes a first seal 124 selectively engageable with a first outlet valve seat 125, and a second seal 126 selectively engageable with a second outlet valve seat 127. The first and second seals 124 and 126 are axially spaced apart from each other, and illustratively comprise elastomeric gaskets. Illustratively, the first outlet valve seat 125 is supported by the retaining cap 110, while the second outlet valve seat 127 is supported by the first housing portion 84 axially distal of the first outlet valve seat 125. As further detailed herein, the poppet valve 120 is configured to toggle axially between a first position where the first seal 124 is in sealing engagement with the first outlet valve seat 125, and a second position where the second seal 126 is in sealing engagement with the second outlet valve seat 127. A poppet spring 130 is operably coupled to the stem assembly 100 to bias the poppet valve 120 axially in a proximal direction toward the first position (e.g., such that the first seal 124 engages the first outlet valve seat 125).

The poppet valve 120 further includes a poppet valve body 158 defining an internal chamber or waterway 160 and coupled to the distal end 104 of the stem assembly 100. An o-ring 128 is illustratively received between the stem assembly 100 and the poppet valve body 158. The second seal 126 is supported by a proximal portion 159 of the poppet valve body 158. A plurality of openings 162 are formed in a distal portion 164 of the poppet valve body 158 and are configured to provide fluid communication between the internal chamber 160 of the poppet valve body 158 and the chamber 88 of the diverter valve housing 83. In turn, the distal openings 94 of the diverter valve housing 83 provide fluid communication between the chamber 88 and the chamber 32 of the valve body 12.

Illustratively, a normally open check valve 170 is operably coupled to the poppet valve 120 and includes a check valve element 172 movable within the waterway 160 between a first check valve seat 174 and a second check valve seat 176. The first and second check valve seats 174 and 176 are axially spaced from each other within the internal chamber 160 of the poppet valve body 158. The check valve element 172 illustratively comprises an elastomeric ball movable from a first position in contact with the first check valve seat 174, a second position in contact with the second check valve seat 176, and intermediate positions therebetween. A spring 180 is operably coupled to the check valve element 172 to bias the check valve 170 in a proximal direction toward the first position (e.g., such that the check valve element 172 engages the first check valve seat 174).

With further reference to FIGS. 3A, 3B and 8, a push-button 190 is operably coupled to the proximal end 102 of the stem assembly 100. The push-button 190 includes an end member or button cap 192 guided in movement by an adapter 194 including an inner cylindrical guide wall 196. A spring 198 is configured to bias the button cap 192 outwardly in a proximal direction. Clips 200 illustratively couple the adapter 194 to the escutcheon 24. Retaining arms 202 formed in the wall plate 20 are received within a groove 204 of the adapter 194 to retain the adapter 194 with the wall plate 20. An o-ring 206 is received intermediate the adapter 194 and the wall plate 20. In the illustrative embodiment, a stem adapter or extender 208 is coupled to the proximal end 102 of the stem assembly 100 and is configured to engage with an end wall 210 the button cap 192. The stem adapter 208 may be used to accommodate variation in the installation of the valve assembly 10 in the shower wall. An annular lip 211 retains the button cap 192 to an edge 214 of the escutcheon 24.

Figure 9:
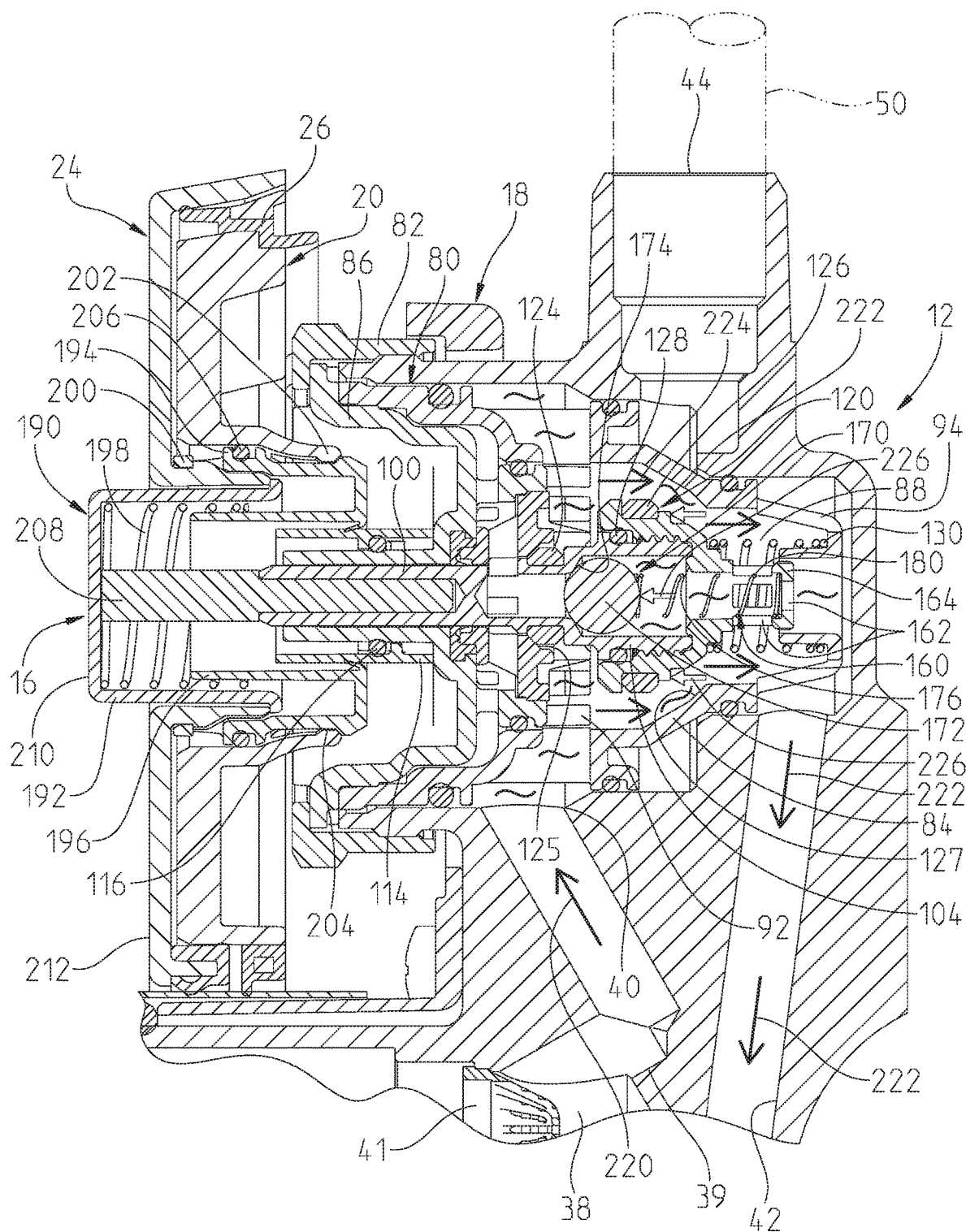
FIG. 9 is a side cross-sectional view similar to FIG. 8, showing the diverter valve assembly in a supply water on/tub port open mode of operation.
Figure 10:
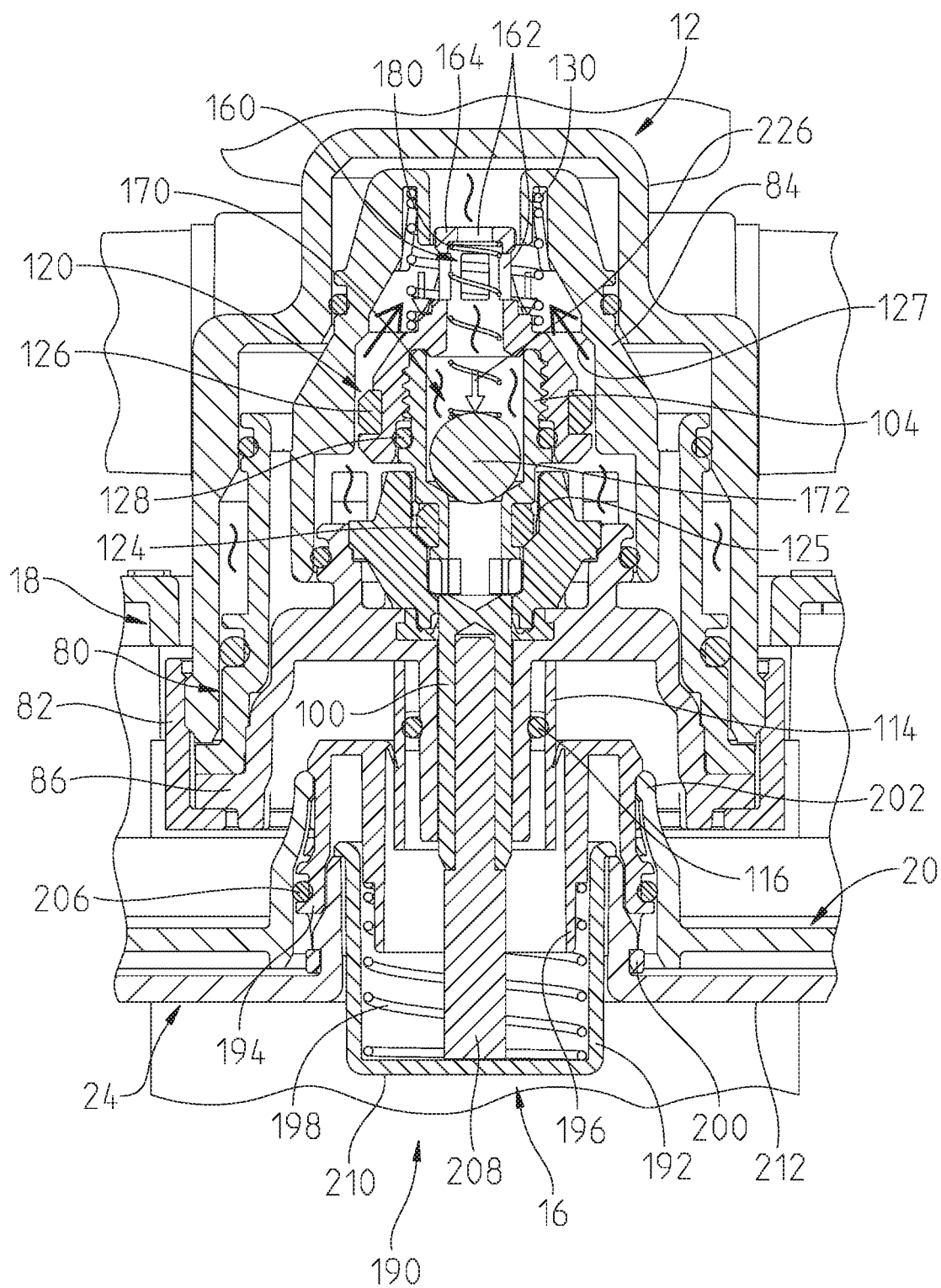
FIG. 10 is a top cross-sectional view similar to FIG. 9.
Figure 11:
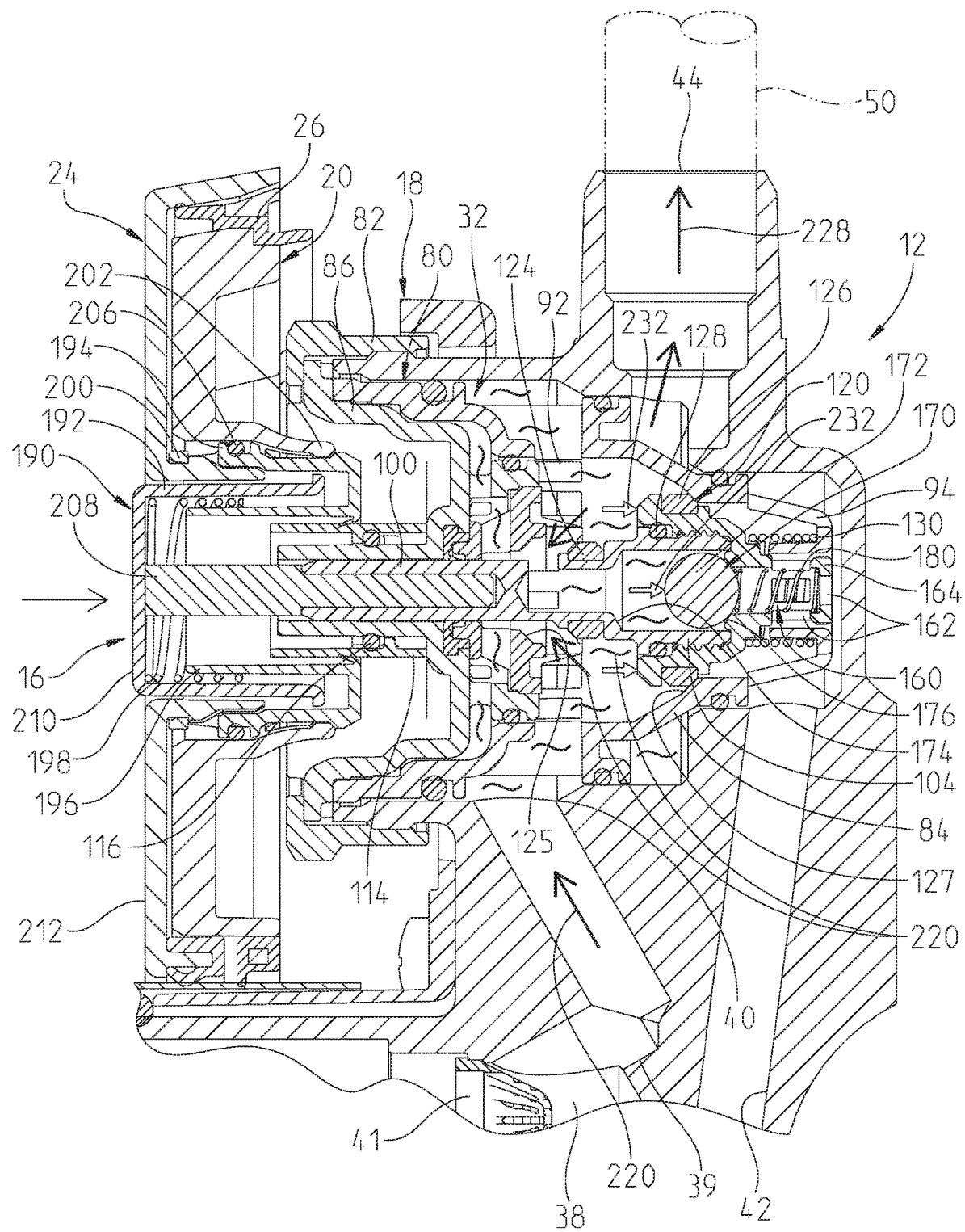
FIG. 11 is a side cross-sectional view similar to FIG. 8, showing the diverter valve assembly in a supply water on/push-button engaged/shower port open mode of operation.
Figure 12:
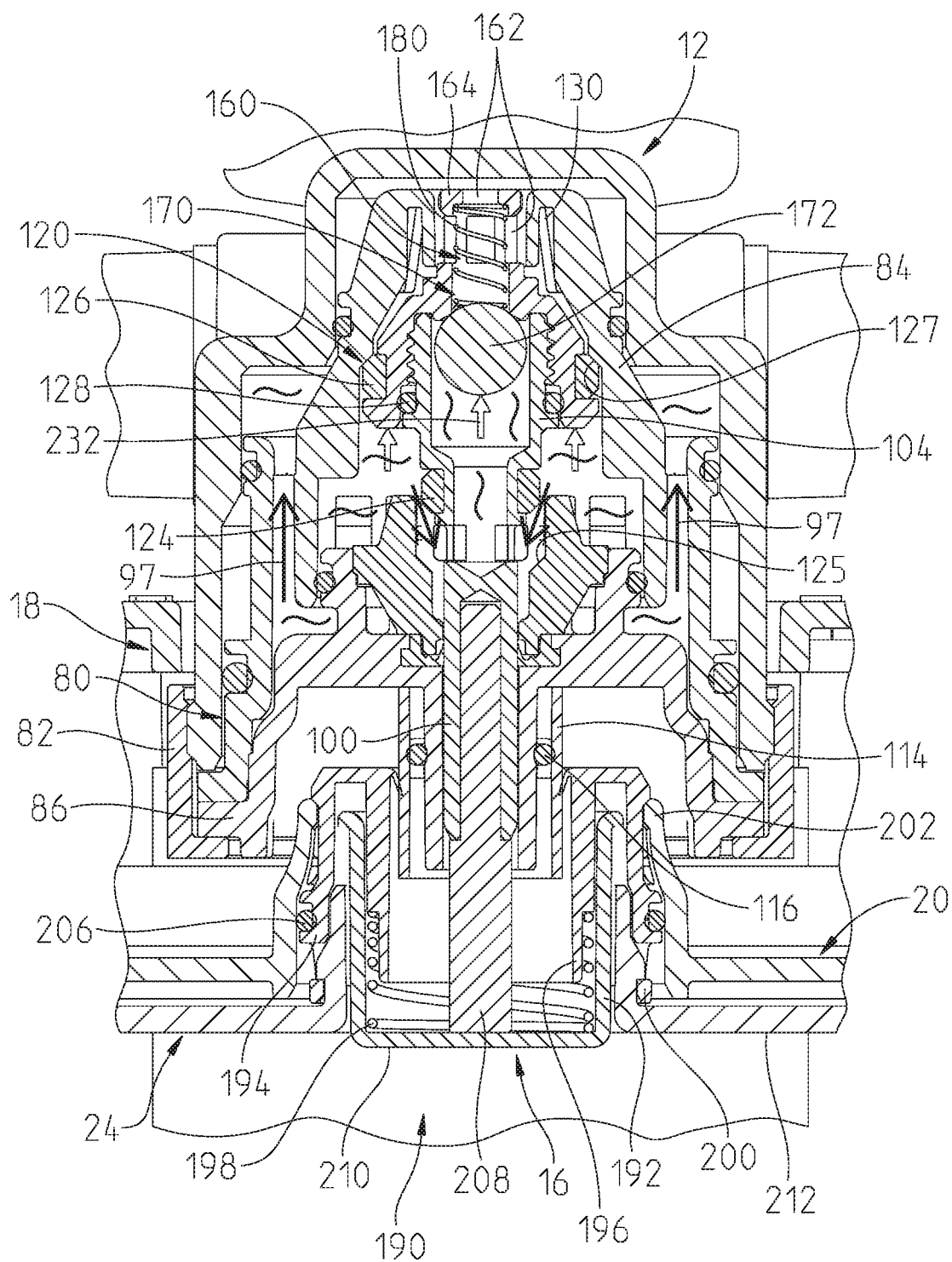
FIG. 12 is a top cross-sectional view similar to FIG. 11.
Figure 13:
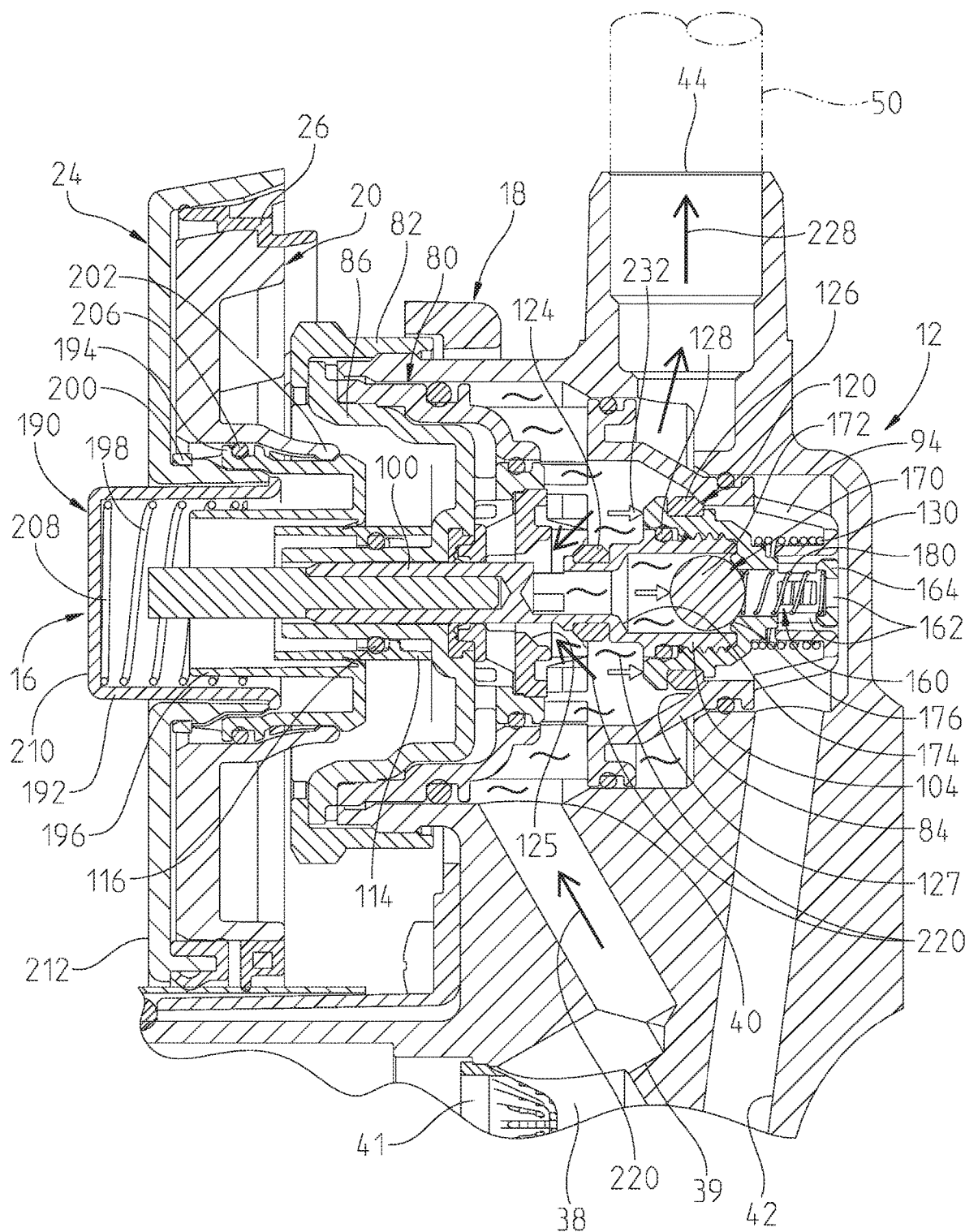
FIG. 13 is a side cross-section view similar to FIG. 8, showing the diverter valve assembly in a water supply on/push-button released/shower port open mode of operation.

Illustratively, the connecting water inlet 40 is in fluid communication with the first water outlet 42 when the first seal 124 engages the first outlet valve seat 125, and the connecting water inlet 40 is sealed from the second water outlet 44 when the check valve element 172 engages the first check valve seat 174 (FIGS. 9 and 10). Illustratively, the connecting water inlet 40 is in fluid communication with the second water outlet 44 when the second seal 126 engages the second outlet valve seat 127, and the connecting water inlet 40 is sealed from the first water outlet 42 when the check valve element 172 engages the second check valve seat 176 (FIGS. 11-13). Further illustratively, the second water outlet 44 is in fluid communication with the first water outlet 42 when the check valve element 172 is in an intermediate position between the first check valve seat 174 and the second check valve seat 176 (FIG. 8).

In the valve body 12, hot and cold water from the water inlets 34 and 36 flows through supply stops (if present), and into the mixing valve assembly 14 where it is mixed. Water temperature and flow rate are illustratively controlled by rotation of the handle 66. The mixed water exits the mixing valve assembly 14 and flows through connecting waterway 39 to the diverter valve assembly 16. Water flowing through the diverter valve assembly 16 is illustratively configured to exit one of two ports (e.g., first water outlet 42 and second water outlet 44), depending on the state of the diverter valve assembly 16. As detailed above, the lower port or first water outlet 42 is connected to the tub spout 46, and the upper port or second water outlet 44 is connected to the showerhead 48.

As further detailed herein, the position of the diverter valve assembly 16, defining the state or mode of operation, is illustratively changed by pressing push-button 190 connected to the stem assembly 100 and the poppet valve 120. In a tub port open mode of operation (FIG. 8), spring 130 holds the diverter valve assembly 16 in an axially proximal position when the water supply is off, and when the water supply is first turned on (FIGS. 9 and 10). When the water supply is turned on, water pressure will also help hold the poppet valve 120 in the tub port open position.

As detailed above, the stem assembly 100 and the poppet valve 120 includes waterway 160 receiving normally open check valve 170. The purpose of the waterway 160 and the check valve 170 is to create a connection between the tub port 42 and the shower port 44 when the water supply is off, allowing water in the shower riser 50 to drain downwardly due to gravity and then out of the tub port 42.

When the water supply is turned on, and the poppet valve 120 is in the tub port open position (default), water pressure causes the check valve 170 to close off the waterway to the shower outlet 44, forcing all of the water flow to the tub port 42. When the diverter push-button 190 is pushed, shifting the poppet valve 120 distally to the shower port open position, water pressure holds the poppet valve 120 in the shower port open position, and causes the check valve 170 to close off the waterway to the tub outlet 42. Thus, all of the water flows out of the shower port 44. Once again, when the water supply is turned off, the poppet spring 130 shifts the poppet valve 120 proximally to the tub port open position, and the spring 180 in the check valve 170 opens the waterway 160, allowing water in the shower riser 50 to flow out of the tub port 42.

In the default or rest position, the push-button 190 in the escutcheon 24 may be flush with the front of the escutcheon 24. More particularly, a front or proximal surface of end wall 210 of the push-button cap 192 may be flush with a front or proximal surface 212 of the escutcheon 24. Alternatively, the push-button cap 192 may extend proximal (i.e., proud) of the escutcheon 24 in the default mode. It should also be noted that an extended push-button 190, proud of the escutcheon 24, would make it easier for those with disabilities to actuate the diverter valve assembly 16. The spring 198 keeps the button cap 192 in its default position (e.g., flush or proud with respect to the escutcheon) no matter the state of the diverter valve assembly 16 (e.g., tub port open or shower port open), and is only used to switch from the default tub port open position to the shower port open position. Once the stem assembly 100 and the poppet valve 120 are in the shower port open position, only shutting the water off will switch them back to the tub port open position, when the stem assembly 100 will re-engage with the push-button 190.

With further reference to FIG. 8, the diverter valve assembly 16 is shown in a supply water off or default mode of operation. More particularly, no water is supplied to the connecting water inlet 40 of the diverter valve assembly 16 from the mixing valve assembly 14. In the position illustrated, the spring 130 forces the poppet valve 120 proximally toward the first outlet valve seat 125, wherein the first seal 124 closes the shower outlet 44 from water flow through the connecting waterway 39. However, the diverter cartridge tub outlet 42 is open. More particularly, the first water outlet 42 is in fluid communication with the second water outlet 44, such that the tub spout 46 is in fluid communication with the riser 50 of the showerhead 48. As shown in FIG. 8, the spring 130 biases the poppet valve 120 axially in a proximal direction such that the first seal 124 engages the first outlet valve seat 125. In this position, the second seal 126 is positioned in spaced relation to the second outlet valve seat 127 to allow water to flow therebetween. Meanwhile, the check valve 170 is in an intermediate position where the check valve element 172 is positioned axially intermediate the first check valve seat 174 and the second check valve seat 176, such that water may flow through the internal waterway 160. More particularly, water from the riser 50 (as shown by arrows 216 in FIG. 8) passes from the shower outlet 44, through the chamber 88, the channels 97, openings 98 (FIGS. 5A and 5B), internal waterway 160, openings 162 and to the tub outlet 42 (as shown by arrows 218 in FIG. 8).

With further reference to FIGS. 9 and 10, the diverter valve assembly 16 is shown in a supply water on, tub port open mode of operation. In this mode, water pressure from the connecting water inlet 40 is supplied to the diverter valve cavity or chamber 32, such that water pressure (as shown by arrows 226 in FIGS. 9 and 10) and the force from the spring 130 holds the poppet valve 120 in the tub open position. More particularly, the poppet valve 120 is moved proximally toward the first outlet valve seat 125 wherein the first seal 124 engages the first outlet valve seat 125. Water pressure 226 also holds the check valve 170 in a closed position by engagement of the check valve element 172 with the first check valve seat 174. The second seal 126 is spaced apart from the second outlet valve seat 127 such that water is free to flow out through the tub port 42. More particularly, water from the connecting waterway 39 (as shown by arrows 220 in FIG. 9) passes through the connecting water inlet 40, through the openings 92, through the chamber 88, between second seal 126 and second outlet valve seat 127, and to the tub outlet 42 (as shown by arrows 222 in FIG. 9).

With further reference to FIGS. 11 and 12, the diverter valve assembly 16 is shown in a supply water on, button engaged, shower port open mode of operation. In this mode, the push-button 190 is depressed such that the stem assembly 100 acts against the poppet valve 120 to open the shower port 44 to water from the connecting waterway 39. More particularly, the poppet valve 120 is moved distally toward the second outlet valve seat 127 wherein the second seal 126 engages the second outlet valve seat 127. Water pressure in the chamber 32 (as shown by arrows 232 in FIG. 11) holds the poppet valve 120 in the shower open position. The first seal 124 is spaced apart from the first outlet valve seat 125 such water may flow through the shower port 44. Water pressure 232 also holds the check valve 170 in a closed position by engagement of the check valve element 172 with the second check valve seat 176. More particularly, water from the connecting waterway 39 (as shown by arrows 220 in FIG. 11) passes through the connecting water inlet 40, through the openings 92, through the chamber 88, between first seal 124 and first outlet seat 125, through channels 97 (FIG. 12), and to the shower outlet 44 (as shown by arrows 228 in FIG. 11).

FIG. 13 illustrates the diverter valve assembly 16 in a supply water on, button released, shower port open mode of operation. This is similar to the mode of FIGS. 11 and 12, but the spring 198 causes the button cap 192 to return to its rest position (e.g., proud of the escutcheon 24).

Figure 14:
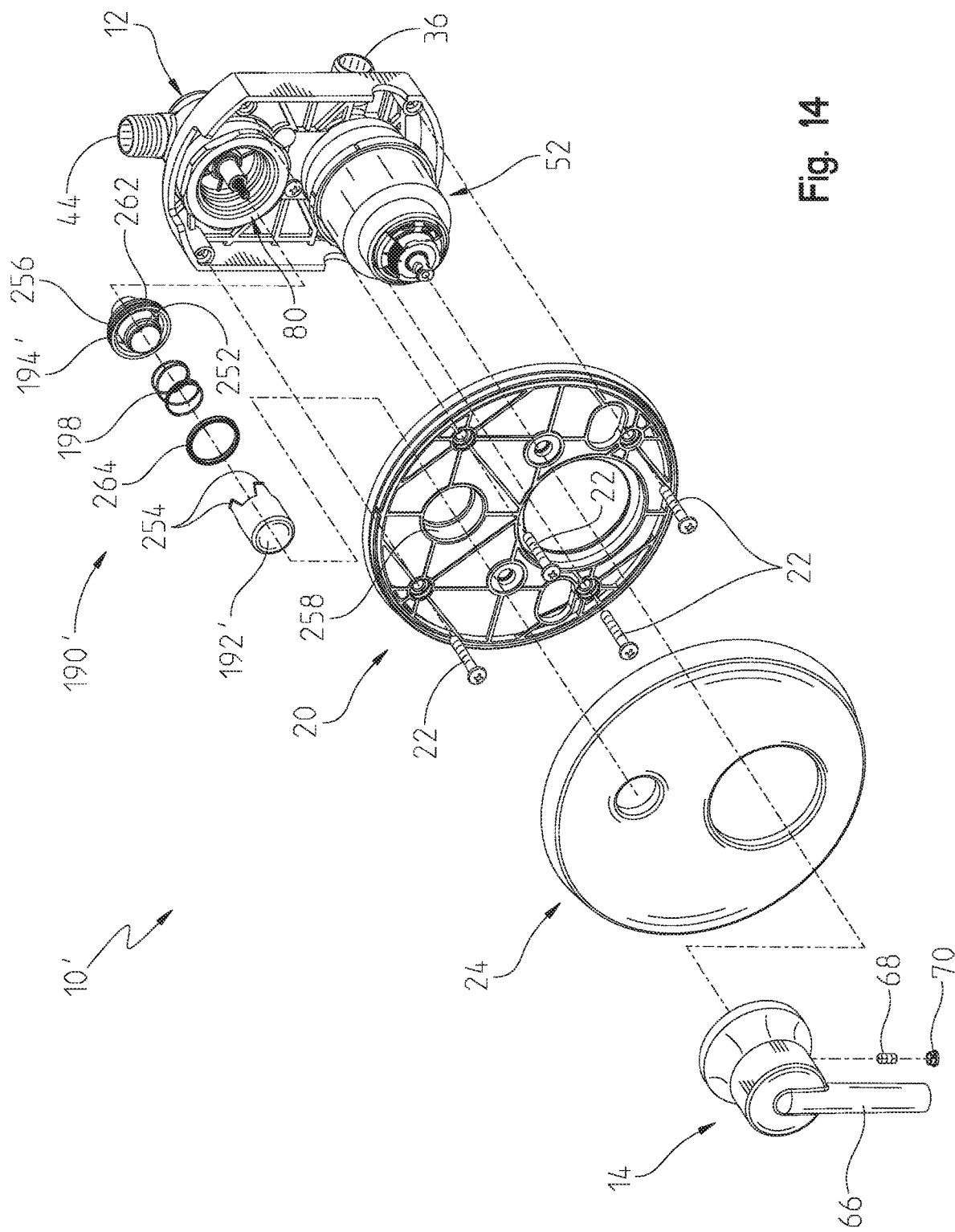
FIG. 14 is a partially exploded perspective view of a shower valve assembly including an alternative push-button assembly of the diverter valve assembly.
Figure 15:
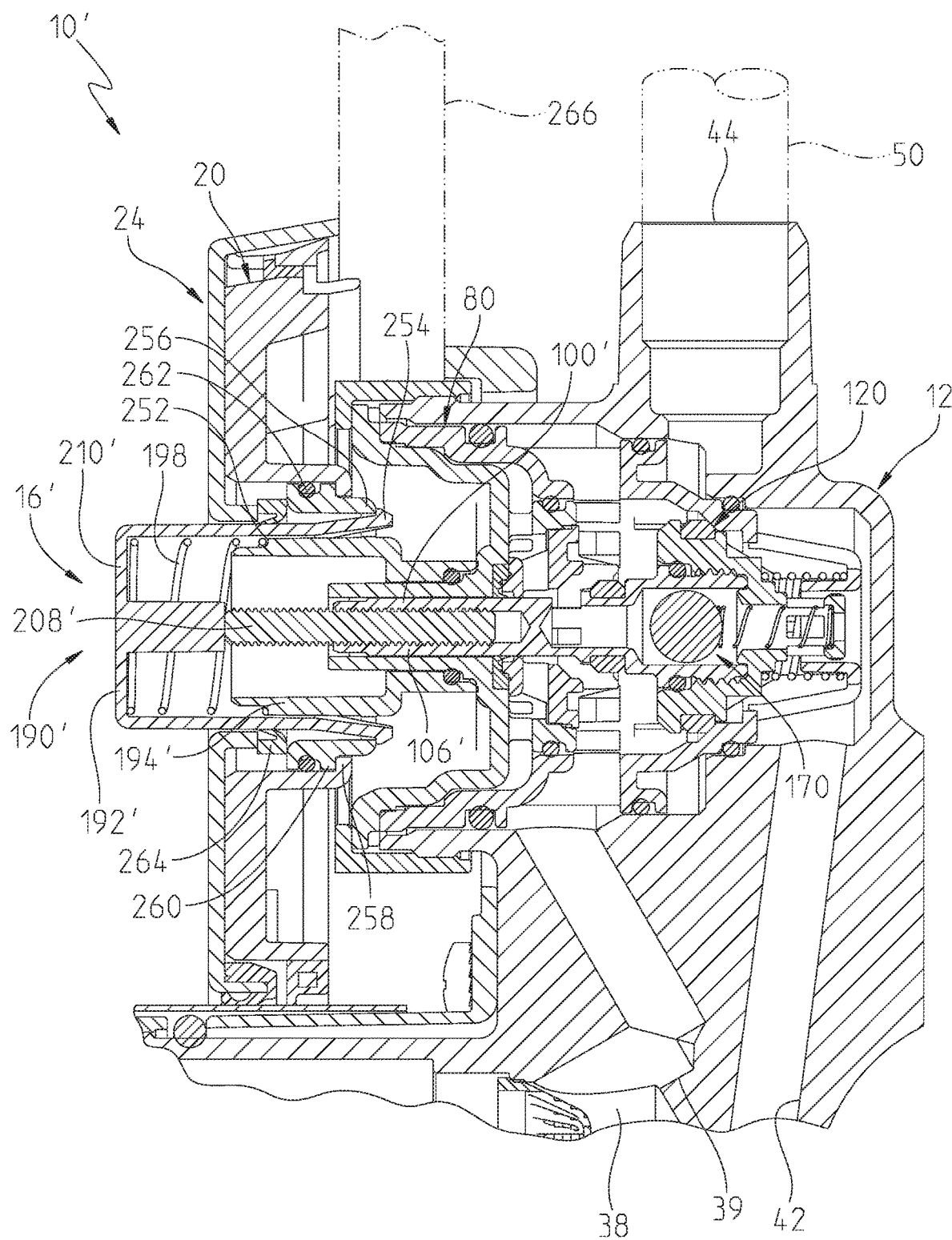
FIG. 15 is a cross-sectional view of the push-button assembly of FIG. 14.

FIGS. 14 and 15 illustrate an alternative embodiment push-button 190' of shower valve assembly 10'. Shower valve assembly 10' of FIGS. 14 and 15 include many similar components of shower valve assembly 10 as detailed above. As such, in the following description similar components will be identified with like reference numbers.

The primary difference between the respective shower valve assemblies 10 and 10' is that the push-button 190' includes alternative button cap 192' and adapter 194'. More particularly, the spring 198 is biased intermediate a shoulder 252 of the adapter 194' and the end wall 210' of the button cap 192'. Retaining fingers 254 illustratively retain the button cap 192' to an inner edge 256 of the adapter 194'. The adapter 194' is illustratively coupled to the wall plate 20 via conventional coupling means, such as engagement between a retaining edge 258 of the wall plate 20 and an annular retaining lip 260 of the adapter 194'. An o-ring 262 is illustratively received intermediate the adapter 194' and the wall plate 20. A seal 264, such as a lip seal, may cooperate with the button cap 192' to provide a seal between the escutcheon 24 and the button cap 192'.

With further reference to FIG. 15, the stem adapter 208' is threadably received within the shaft 106' of the valve stem assembly 100'. As such, the axial position of the stem adapter 208' relative to the diverter valve assembly 16' may be adjusted which, in turn, adjusts the position of the button cap 192'. Such adjustment may account for different component tolerances and mounting thicknesses relative to the shower wall 266.

Figure 16:
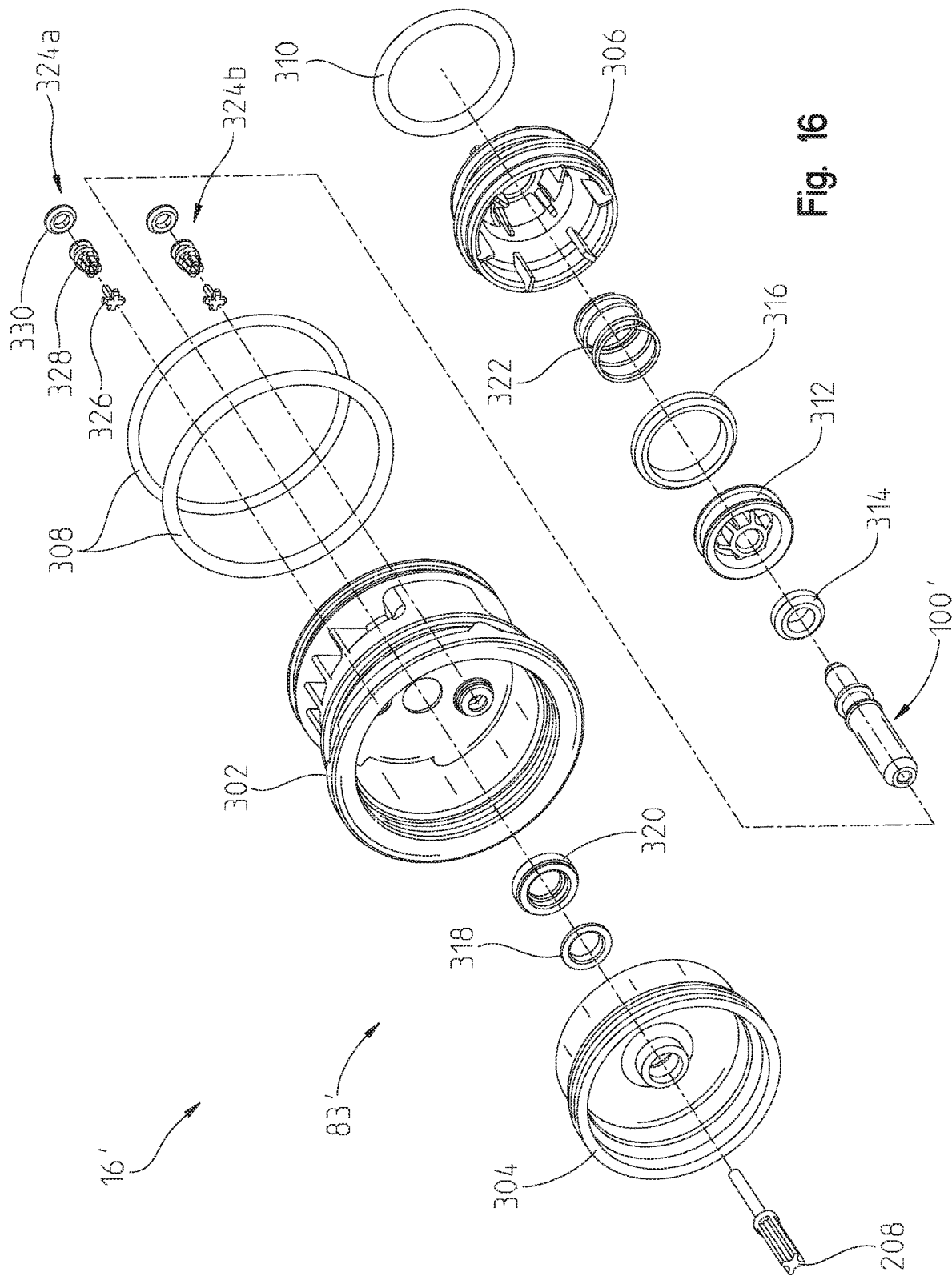
FIG. 16 is an exploded perspective view of a further illustrative embodiment diverter valve assembly including an alternative check valve configuration.
Figure 17:
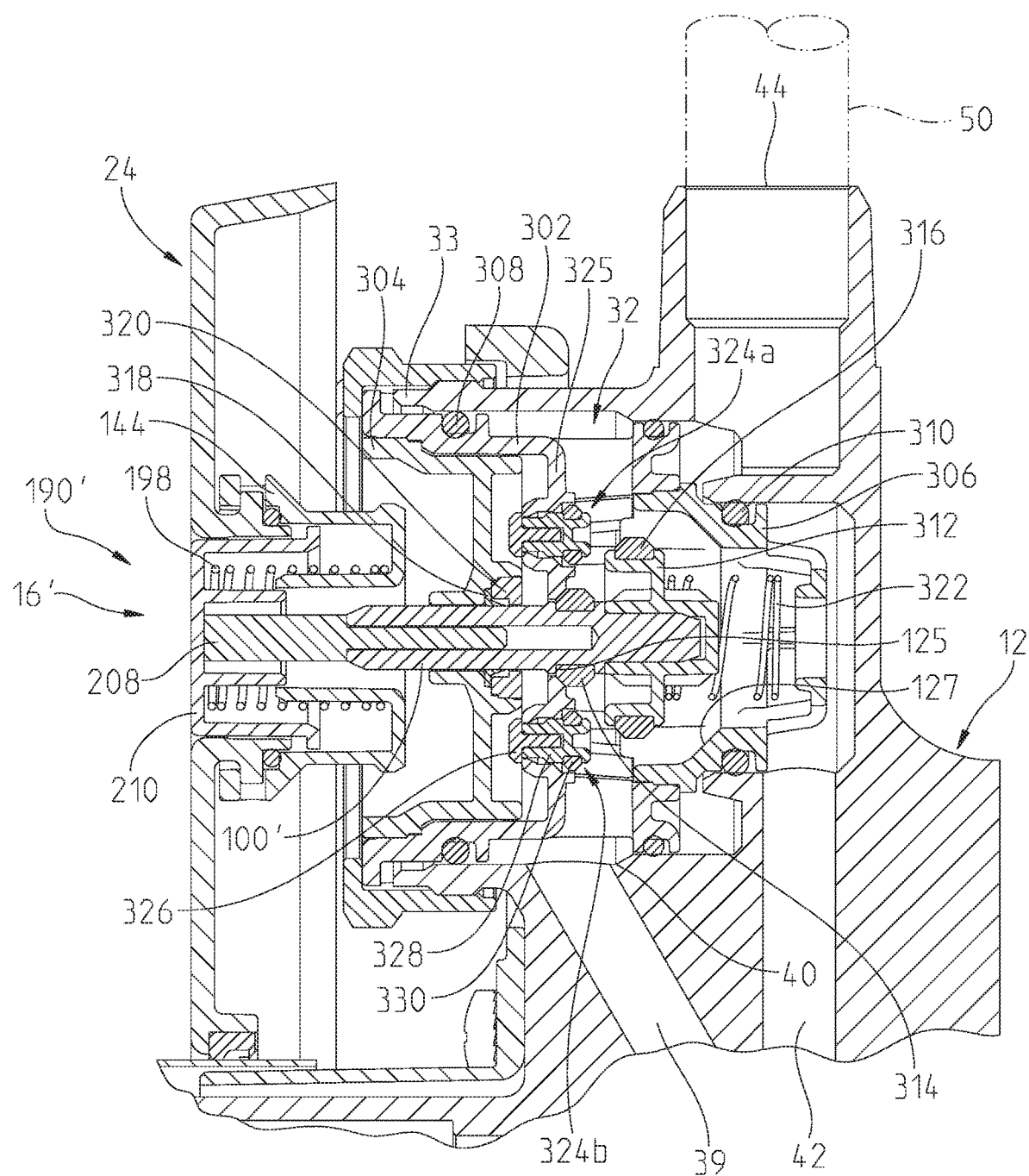
FIG. 17 is a cross-sectional view of the diverter valve assembly of FIG. 16.

FIGS. 16 and 17 show a further illustrative embodiment diverter valve assembly 16' including floating check valves 324a and 324b positioned in a sealing wall 325 between the shower outlet 44 and the connecting waterway 39/tub outlet 42. Alternatively, a normally open check valve could be located in the wall of the valve body 12 between the shower outlet 44 and the tub outlet 42.

The diverter valve assembly of FIGS. 16 and 17 could be used with the other components of the shower valve assembly 10 as detailed above. As such, similar components will be in the following description, similar components will be identified with like reference numbers.

With further reference to FIGS. 16 and 17, the check valve 170 internal to the poppet valve 120 of the diverter valve assembly 16 detailed above, instead is replaced with the pair of check valves 324a and 324b received within sealing wall 325 of the diverter valve assembly 16'. Each check valve 324 includes a retainer 326 operably coupled to a check stem 328 to secure the check valve 324 within the wall 325. A seal 330 is supported by the check stem 328. A housing 302 includes a proximal end coupled to a cap 304, and a distal end coupled to an end cap 306. O-rings 308 and 310 are supported by the housing 302 and the end cap 306, respectively. A poppet body 312 is supported by the stem assembly 100'. A first seal 314 is supported by the stem assembly 100', and a second seal 316 is supported by the poppet body 312. The stem assembly 100' is illustratively received within a seal 318 and a retainer 320. A spring 322 biases the poppet body 312 in axially in a proximal direction.

Operation of the diverter valve assembly 16' is illustratively similar to the operating modes detailed above with respect to diverter valve assembly 16. More particularly, in a first mode of operation, the connecting inlet port 40 is in fluid communication with the first outlet port 42, and the connecting inlet port 40 is sealed from the second outlet port 44. In this first mode of operation, the first seal 314 engages the first outlet seat 125, and the check valves 324 seals the first outlet port 42 from the second outlet port 44. In a second mode of operation, the connecting inlet port 40 is in fluid communication with the second outlet port 44, and the connecting inlet port 40 is sealed from the first outlet port 42. In this mode of operation, the second seal 316 engages the second valve seat 127, and the check valves 324 seal the first outlet port 42 from the second outlet port 44. In a third mode of operation, the check valves 324 provide fluid communication between the second outlet port 42 and the first outlet port 44.

Although the invention has been described in detail with reference to certain preferred embodiments, variations and modifications exist within the spirit and scope of the invention as described and defined in the following claims.

The invention claimed is:

1. A shower valve assembly comprising:
   a valve body including a first receiving cavity and a second receiving cavity, a cold water inlet port, a hot water inlet port and a connecting outlet port in fluid communication with the first receiving cavity, and a connecting inlet port, a first outlet port and a second outlet port in fluid communication with the second receiving cavity, the connecting inlet port being in fluid communication with the connecting outlet port;
a mixing valve assembly supported within the first receiving cavity, the mixing valve assembly configured to control water flow from the cold water inlet and the hot water inlet to the connecting outlet port; and
a diverter valve assembly supported within the second receiving cavity, the diverter valve assembly configured to control water flow from the connecting inlet port to at least one of the first outlet port and the second outlet port;
wherein the diverter valve assembly includes:
 a push-button;
 a valve stem extending along a longitudinal axis between a first end and a second end, the first end being operably coupled to the push-button;
 a flow control chamber, a first outlet valve seat supported within the flow control chamber, and a second outlet valve seat supported within the flow control chamber in axially spaced relation to the first outlet valve seat;
 a poppet valve supported by the second end of the valve stem and axially movable within the flow control chamber, the poppet valve including a poppet valve body defining an internal chamber, a first seal supported by the poppet valve body and selectively engageable with the first outlet valve seat, a second seal supported by the poppet valve body in axially spaced relation to the first seal and selectively engageable with the second outlet valve seat, and a spring operably coupled to the second end of the valve stem and configured to bias the first seal toward the first outlet valve seat; and
 a check valve operably coupled to the poppet valve, the check valve including a movable valve element received within the internal chamber of the poppet valve body;
 a first check valve seat supported within the internal chamber of the poppet valve body;
 a second check valve seat supported within the internal chamber of the poppet valve body; wherein:
 the valve element of the check valve is movable between a first position in contact with the first check valve seat, a second position in contact with the second check valve seat, and a third position intermediate the first position and the second position;
 the first seal of the poppet valve body engages the first outlet valve seat, and the movable valve element of the check valve engages the first check valve seat in a first mode of operation;
 the second seal of the poppet valve body engages the second outlet valve seat, and the movable valve element of the check valve engages the second check valve seat in a second mode of operation; and
 the movable valve element of the check valve is in the intermediate position in a third mode of operation.

2. The shower valve assembly of claim 1, wherein:
the first mode of operation is defined when the connecting inlet port is in fluid communication with the first outlet port, and the connecting inlet port is sealed from the second outlet port;
the second mode of operation is defined when the connecting inlet port is in fluid communication with the second outlet port, and the connecting inlet port is sealed from the first outlet port;
the third mode of operation is defined when the second outlet port is in fluid communication with the first outlet port.

3. The shower valve assembly of claim 1, further comprising a plaster guard coupled to the valve body.

4. The shower valve assembly of claim 1, wherein the first outlet port is in fluid communication with a tub spout, and the second outlet port is in fluid communication with a showerhead.

5. A shower valve assembly comprising:
a valve body including a first receiving cavity and a second receiving cavity, a cold water inlet port, a hot water inlet port and a connecting outlet port in fluid communication with the first receiving cavity, and a connecting inlet port, a first outlet port and a second outlet port in fluid communication with the second receiving cavity, the connecting inlet port being in fluid communication with the connecting outlet port;
a mixing valve assembly supported within the first receiving cavity, the mixing valve assembly configured to control water flow from the cold water inlet and the hot water inlet to the connecting outlet port;
a diverter valve assembly supported within the second receiving cavity, the diverter valve assembly configured to control water flow from the connecting inlet port to at least one of the first outlet port and the second outlet port;
wherein the diverter valve assembly includes:
 a push-button;
 a valve stem extending along a longitudinal axis between a first end and a second end, the first end being operably coupled to the push-button;
 a flow control chamber, a first outlet valve seat supported within the flow control chamber, and a second outlet valve seat supported within the flow control chamber in axially spaced relation to the first outlet valve seat;
 a poppet valve supported by the second end of the valve stem and axially movable within the flow control chamber, the poppet valve including a poppet valve body defining an internal chamber, a first seal supported by the poppet valve body and selectively engageable with the first outlet valve seat, a second seal supported by the poppet valve body in axially spaced relation to the first seal and selectively engageable with the second outlet valve seat, and a spring operably coupled to the second end of the valve stem and configured to bias the first seal toward the first outlet valve seat; and
 a check valve operably coupled to the poppet valve, the check valve including a movable valve element received within the internal chamber of the poppet valve body; and
 a first check valve seat supported within the internal chamber of the poppet valve body, and a second check valve seat supported within the internal chamber of the poppet valve body, the movable valve element of the check valve includes a ball configured to move between the first check valve seat and the second check valve seat.

6. The shower valve assembly of claim 5, further comprising a spring biasing the ball toward the first check valve seat.

7. A shower valve assembly comprising:
a valve body including a first receiving cavity and a second receiving cavity, a cold water inlet port, a hot water inlet port and a connecting outlet port in fluid communication with the first receiving cavity, and a connecting inlet port, a first outlet port and a second outlet port in fluid communication with the second receiving cavity, the connecting inlet port being in fluid communication with the connecting outlet port;
a mixing valve assembly supported within the first receiving cavity, the mixing valve assembly configured to control water flow from the cold water inlet and the hot water inlet to the connecting outlet port; and
a diverter valve assembly supported within the second receiving cavity, the diverter valve assembly configured to control water flow from the connecting inlet port to at least one of the first outlet port and the second outlet port;
wherein the diverter valve assembly includes:
a push-button including an adapter receiving the stem, a button cap receiving the adapter, and a push-button spring extending between the adapter and the stem to bias the button cap away from the stem;
a valve stem extending along a longitudinal axis between a first end and a second end, the first end being operably coupled to the push-button;
a flow control chamber, a first outlet valve seat supported within the flow control chamber, and a second outlet valve seat supported within the flow control chamber in axially spaced relation to the first outlet valve seat;
a poppet valve supported by the second end of the valve stem and axially movable within the flow control chamber, the poppet valve including a poppet valve body defining an internal chamber, a first seal supported by the poppet valve body and selectively engageable with the first outlet valve seat, a second seal supported by the poppet valve body in axially spaced relation to the first seal and selectively engageable with the second outlet valve seat, and a spring operably coupled to the second end of the valve stem and configured to bias the first seal toward the first outlet valve seat; and
a check valve operably coupled to the poppet valve, the check valve including a movable valve element received within the internal chamber of the poppet valve body.

8. The shower valve assembly of claim 7, further comprising a wall plate coupled to the adapter and configured to be coupled to a support wall.

9. The shower valve assembly of claim 8, further comprising an escutcheon supported by the wall plate, the push-button spring configured to bias the button cap at least flush with an outer surface of the escutcheon.

10. The shower valve assembly of claim 8, further comprising a lip seal operably coupled to the button cap.

11. A shower valve assembly comprising:
a valve body including a connecting inlet port, a first outlet port, and a second outlet port;
a diverter valve assembly configured to control water flow from the connecting inlet port to at least one of the first outlet port and the second outlet port;
wherein the diverter valve assembly includes:
a push-button;
a valve stem extending along a longitudinal axis between a first end and a second end, the first end being operably coupled to the push-button;
a flow control chamber receiving the second end of the valve stem, a first outlet valve seat supported within the flow control chamber, and a second outlet valve seat supported within the flow control chamber in axially spaced relation to the first outlet valve seat;
a poppet valve supported by the second end of the valve stem and axially movable within the flow control chamber, the poppet valve including a poppet valve body defining an internal chamber, a first seal supported by the poppet valve body and selectively engageable with the first outlet valve seat, and a second seal supported by the poppet valve body in axially spaced relation to the first seal and selectively engageable with the second outlet valve seat;
a check valve operably coupled to the poppet valve, the check valve including a first check valve seat supported within the internal chamber of the poppet valve body, a second check valve seat supported within the internal chamber of the poppet valve body in axially spaced relation to the first check valve seat, and a valve element received within the internal chamber of the poppet valve body;
the valve element of the check valve is movable between a first position in contact with the first check valve seat, a second position in contact with the second check valve seat, and a third position intermediate the first position and the second position;
a first mode of operation is defined when the connecting inlet port is in fluid communication with the first outlet port, and the connecting inlet port is sealed from the second outlet port;
the first seal of the poppet valve body engages the first outlet valve seat, and the valve element of the check valve engages the first check valve seat in the first mode of operation;
a second mode of operation is defined when the connecting inlet port is in fluid communication with the second outlet port, and the connecting inlet port is sealed from the first outlet port;
the second seal of the poppet valve body engages the second outlet valve seat, and the valve element of the check valve engages the second check valve seat in the second mode of operation;
a third mode of operation is defined when the second outlet port is in fluid communication with the first outlet port; and
the valve element of the check valve is in the intermediate position in the third mode of operation.

12. The shower valve assembly of claim 11, wherein the movable valve element of the check valve includes a ball configured to move between the first check valve seat and the second check valve seat.

13. The shower valve assembly of claim 12, further comprising a spring biasing the ball toward the first check valve seat.

14. The shower valve assembly of claim 12, wherein the push-button includes an adapter receiving the stem, a button cap receiving the adapter, and a push-button spring extending between the adapter and the stem to bias the button cap away from the stem.

15. The shower valve assembly of claim 14, further comprising a wall plate coupled to the adapter and configured to be coupled to a support wall.

16. The shower valve assembly of claim 15, further comprising an escutcheon supported by the wall plate, the push-button spring configured to bias the button cap at least flush with an outer surface of the escutcheon.

17. The shower valve assembly of claim 15, further comprising a lip seal operably coupled to the button cap.

18. The shower valve assembly of claim 11, further comprising:
a mixing valve assembly;
wherein the valve body includes a first receiving cavity and a second receiving cavity, a cold water inlet port, a hot water inlet port and a connecting outlet port in fluid communication with the first receiving cavity, and the connecting inlet port, the first outlet port and the second outlet port are in fluid communication with the second receiving cavity; and
wherein the mixing valve assembly is supported within the first receiving cavity, the mixing valve assembly being configured to control water flow from the cold water inlet and the hot water inlet to the connecting outlet port.

19. The shower valve assembly of claim 11, further comprising a plaster guard coupled to the valve body.

20. The shower valve assembly of claim 11, wherein the first outlet port is in fluid communication with a tub spout, and the second outlet port is in fluid communication with a showerhead.

21. The shower valve assembly of claim 11, further comprising a spring operably coupled to the second end of the valve stem and configured to bias the first seal toward the first outlet valve seat.

22. A shower valve assembly comprising:
a valve body including a first receiving cavity and a second receiving cavity, a cold water inlet port, a hot water inlet port and a connecting outlet port in fluid communication with the first receiving cavity, and a connecting inlet port, a first outlet port and a second outlet port in fluid communication with the second receiving cavity, the connecting inlet port being in fluid communication with the connecting outlet port;
a mixing valve assembly supported within the first receiving cavity, the mixing valve assembly configured to control water flow from the cold water inlet and the hot water inlet to the connecting outlet port;
a diverter valve assembly supported within the second receiving cavity, the diverter valve assembly configured to control water flow from the connecting inlet port to at least one of the first outlet port and the second outlet port;
wherein the diverter valve assembly includes:
a push-button;
a valve stem extending along a longitudinal axis between a first end and a second end, the first end being operably coupled to the push-button;
a flow control chamber, a first outlet valve seat supported within the flow control chamber, and a second outlet valve seat supported within the flow control chamber in axially spaced relation to the first outlet valve seat;
a flow control valve supported by the second end of the valve stem, the flow control valve being movable between a first position in engagement with the first outlet valve seat and a second position in engagement with the second outlet valve seat; and
a check valve operably coupled to the flow control valve;
a first mode of operation is defined when the connecting inlet port is in fluid communication with the first outlet port, and the connecting inlet port is sealed from the second outlet port;
the flow control valve is in the first position, in engagement with the first outlet valve seat, and the check valve seals the first outlet port from the second outlet port, in the first mode of operation;
a second mode of operation is defined when the connecting inlet port is in fluid communication with the second outlet port, and the connecting inlet port is sealed from the first outlet port;
the flow control valve is in the second position, in engagement with the second valve seat, and the check valve seals the first outlet port from the second outlet port, in the second mode of operation; and
a third mode of operation is defined when the check valve provides fluid communication between the second outlet port and the first outlet port.

23. The shower valve assembly of claim 22, wherein the flow control valve comprises a poppet valve including a first seal selectively engageable with the first valve seat, a second seal in axially spaced relation to the first seal and selectively engageable with the second valve seat, and a spring operably coupled to the second end of the valve stem and configured to bias the first seal toward the first valve seat.

24. The shower valve assembly of claim 23, wherein:
the check valve includes a first check valve seat, a second check valve seat, and a movable valve element;
the valve element of the check valve is movable between a first position in contact with the first check valve seat, a second position in contact with the second check valve seat, and a third position intermediate the first position and the second position;
the first seal of the poppet valve body engages the first outlet valve seat, and the movable valve element of the check valve engages the first check valve seat in the first mode of operation;
the second seal of the poppet valve body engages the second valve seat, and the movable valve element of the check valve engages the second check valve seat in the second mode of operation; and
the movable valve element of the check valve is in the intermediate position in the third mode of operation.

25. The shower valve assembly of claim 24, wherein the poppet valve includes a poppet valve body defining an internal chamber, and the movable valve element of the check valve is received within the internal chamber of the poppet valve body.

26. The shower valve assembly of claim 24, wherein the movable valve element of the check valve includes a ball configured to move between the first check valve seat and the second check valve seat.

27. The shower valve assembly of claim 26, further comprising a spring biasing the ball toward the first check valve seat.

28. The shower valve assembly of claim 22, wherein the push-button includes an adapter receiving the stem, a button cap receiving the adapter, and a spring extending between the adapter and the stem to bias the button cap away from the stem.

29. The shower valve assembly of claim 28, further comprising a wall plate coupled to the adapter and configured to be coupled to a support wall.

30. The shower valve assembly of claim 29, further comprising an escutcheon supported by the wall plate.

31. The shower valve assembly of claim 28, further comprising a lip seal operably coupled to the button cap.

32. The shower valve assembly of claim 22, further comprising a plaster guard coupled to the valve body.

* * * * *